United States Patent
Takeda

(10) Patent No.: US 9,587,707 B2
(45) Date of Patent: Mar. 7, 2017

(54) DRIVE FORCE TRANSMISSION APPARATUS

(71) Applicant: DENSO CORPORATION, Kariya, Aichi-pref. (JP)

(72) Inventor: Tetsuma Takeda, Obu (JP)

(73) Assignee: DENSO CORPORATION, Kariya (JP)

( * ) Notice: Subject to any disclaimer, the term of this patent is extended or adjusted under 35 U.S.C. 154(b) by 60 days.

(21) Appl. No.: 14/596,676

(22) Filed: Jan. 14, 2015

(65) Prior Publication Data
US 2015/0204248 A1 Jul. 23, 2015

(30) Foreign Application Priority Data
Jan. 17, 2014 (JP) .................................... 2014-6859

(51) Int. Cl.
| | | |
|---|---|---|
| F16D 3/68 | (2006.01) |
| F16F 15/126 | (2006.01) |
| F16H 55/14 | (2006.01) |
| F02B 31/06 | (2006.01) |
| F16K 31/04 | (2006.01) |

(Continued)

(52) U.S. Cl.
CPC ............ *F16F 15/126* (2013.01); *F02B 31/06* (2013.01); *F02D 9/1065* (2013.01); *F16D 3/68* (2013.01); *F16K 31/041* (2013.01); *F02D 2009/0261* (2013.01); *F16H 55/14* (2013.01); *Y02T 10/146* (2013.01); *Y10T 74/19633* (2015.01)

(58) Field of Classification Search
CPC ............ F16D 3/68; F16F 15/126; F16F 55/14
See application file for complete search history.

(56) References Cited

U.S. PATENT DOCUMENTS

2006/0060616 A1 3/2006 Suga
2009/0184122 A1 7/2009 Suga
(Continued)

FOREIGN PATENT DOCUMENTS

JP 59-171255 11/1984
JP 9-60073 3/1997
(Continued)

OTHER PUBLICATIONS

Office Action (1 page) dated Jan. 26, 2016, issued in corresponding Japanese Application No. 2014-006859 with English translation (3 pages).

*Primary Examiner* — William Kelleher
*Assistant Examiner* — Gregory Prather
(74) *Attorney, Agent, or Firm* — Nixon & Vanderhye P.C.

(57) ABSTRACT

A coupling unit includes an output gear, a coupling and a rubber cushion. A second rotatable shaft portion of the coupling includes a resilient projection that projects outwardly in a radial direction from an outer peripheral surface of the second rotatable shaft portion. The resilient projection is resiliently inwardly deformed in the radial direction during movement of the resilient projection along a deep side of a recessed groove of a through-hole formed in a first rotatable shaft portion of the output gear at a time of fitting the second rotatable shaft portion into the through-hole. When the resilient projection projects from the through-hole, the resilient projection is resiliently outwardly restored and is engaged to an engaging portion of the first rotatable shaft portion to limit removal of the second rotatable shaft portion from the through-hole.

12 Claims, 13 Drawing Sheets

(51) Int. Cl.
 *F02D 9/10* (2006.01)
 *F02D 9/02* (2006.01)

(56) References Cited

U.S. PATENT DOCUMENTS

2012/0264524 A1  10/2012  Nakagawa et al.
2013/0035192 A1*  2/2013  Hayashi .................. F02D 11/10
                                                                    475/198
2014/0080610 A1  3/2014  Nakagawa et al.

FOREIGN PATENT DOCUMENTS

| JP | 11-311261   | 11/1999 |
| JP | 2005-188675 | 7/2005  |
| JP | 2011-137488 | 7/2011  |
| JP | 2013-50207  | 3/2013  |

* cited by examiner

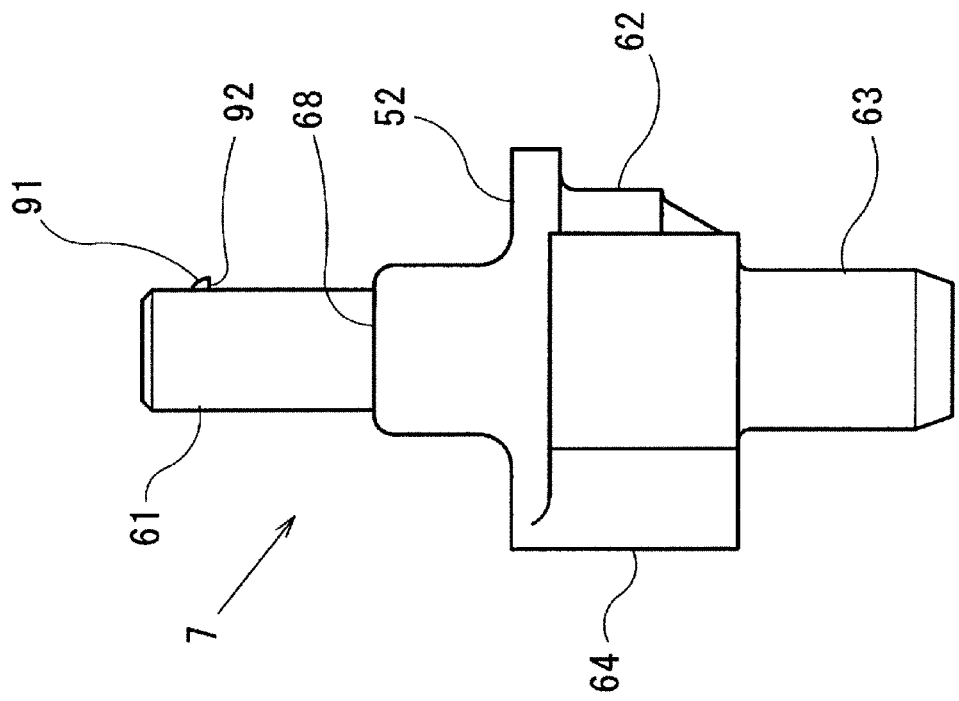
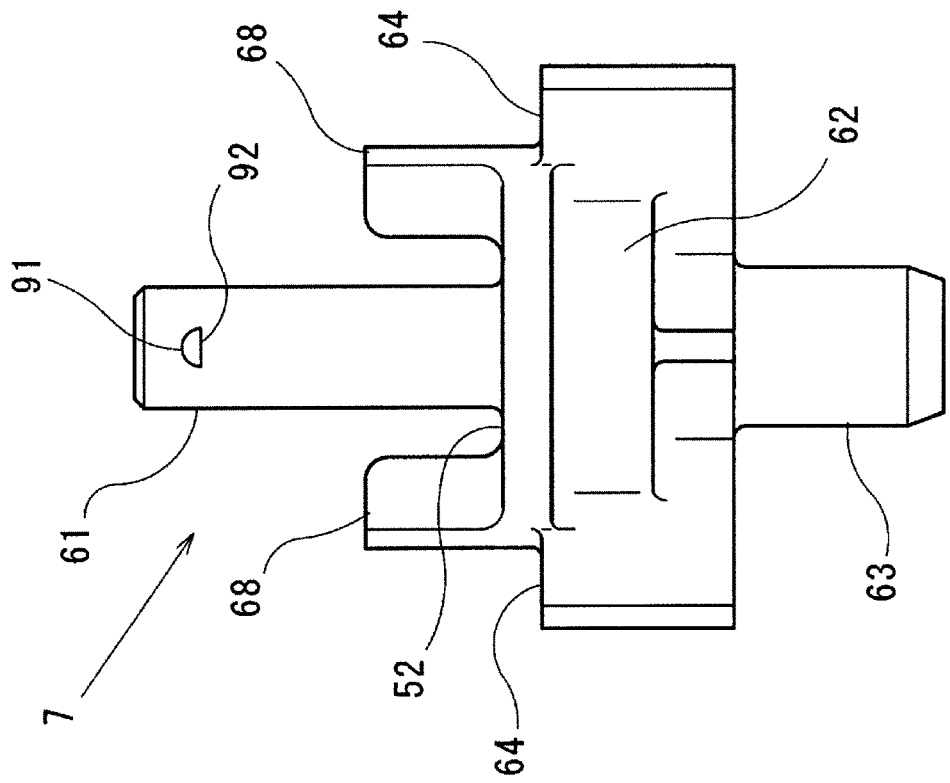

DRIVE FORCE TRANSMISSION APPARATUS

CROSS REFERENCE TO RELATED APPLICATION

This application is based on and incorporates herein by reference Japanese Patent Application No. 2014-006859 filed on Jan. 17, 2014.

TECHNICAL FIELD

The present disclosure relates to a drive force transmission apparatus that transmits a drive force of an electric motor to a shaft of a driven subject.

BACKGROUND

A known intake system includes an intake control valve (hereinafter referred to as a tumble control valve) and an actuator to control supply of intake air to an internal combustion engine, which has a plurality of cylinders. The tumble control valve generates an intake air vortex (a tumble flow), which flows in a combustion chamber of each cylinder around an axis perpendicular to an axis of the cylinder, so that a combustion efficiency in the combustion chamber is improved to improve fuel consumption and emissions (e.g., improving HC reducing effect) of the engine. The actuator drives tumble valves, which are valve elements of the tumble control valve.

As shown in FIG. 13, the tumble control valve includes an intake manifold 1, a plurality of tumble valves 3, a valve shaft 4 and a bearing device (an oil seal 9, a bearing 10). The intake manifold 1 forms a flow passage that is communicated with the combustion chamber of each cylinder of the engine. Each tumble valve 3 opens and closes a corresponding flow passage. The valve shaft 4 is connected to the tumble valves 3 to rotate integrally with the tumble valves 3. The bearing device (the oil seal 9, the bearing 10) supports the valve shaft 4 in a slidable manner in a rotational direction of the valve shaft 4.

The intake manifold 1 includes a surge tank and a plurality of intake branch conduits. The surge tank includes a plurality of intake air outlets. The intake branch conduits are connected to the intake air outlets, respectively, of the surge tank.

In each of the intake branch conduit, a partition 13, such as a partition wall, which partitions an inside space (an intake branch flow passage) of the intake branch conduit into a first intake branch flow passage 11 and a second intake branch flow passage 12.

The first intake branch flow passage 11 and the second intake branch flow passage 12 form flow passages that are communicated with the combustion chamber of the corresponding cylinder of the engine.

The actuator includes an electric motor (hereinafter simply referred to as a motor) M, a speed reducing mechanism, and a drive force transmission apparatus. The motor M generates a rotational drive force that drives the tumble valves 3. The speed reducing mechanism reduces a speed of rotation transmitted from a motor shaft 5, which is an output shaft of the motor M. The drive force transmission apparatus transmits the rotational drive force of the motor M to the valve shaft 4 of the tumble control valve.

The speed reducing mechanism includes a worm gear 14, a helical gear 15, a pinion gear 16 and the output gear 6. The worm gear 14 is connected to the motor shaft 5 to rotate integrally with the motor shaft 5. The helical gear 15 is engaged with, i.e., is meshed with the worm gear 14 and is rotated by the worm gear 14. The pinion gear 16 and the helical gear 15 are placed along a common axis. The output gear 17 is meshed with the pinion gear 16 and is rotated by the pinion gear 16. Furthermore, the helical gear 15 and the pinion gear 16 are rotatably supported by an outer peripheral surface of a gear shaft 20, which extends in a direction perpendicular to a direction of the rotational axis of the motor shaft 5.

The drive force transmission apparatus includes the output gear (serving as a first rotatable member) 17, a gear shaft coupling (serving as a second rotatable member) 18, and a rubber cushion (a shock absorbing member) 19 (see, for example, JP2013-050207A corresponding to US2013/0035192A1). The output gear 17 and the gear shaft coupling (hereinafter simply referred to as a coupling) 18 are placed along a common rotational axis and are rotatable relative to each other. The rubber cushion 19 is made of a rubbery elastic material and can be resiliently deformed in a twisting direction about the rotational axis of the drive force transmission apparatus.

The output gear 17 includes a plurality of primary projections (hereinafter referred to as primary partitions), and the coupling 18 includes a plurality of secondary projections (hereinafter referred to as secondary partitions). The primary projections and the secondary projections are alternately arranged one after another in a circumferential direction about the rotational axis.

The rubber cushion 19 includes primary elastic bodies and secondary elastic bodies. Each primary elastic body is placed between the corresponding primary partition and the corresponding secondary partition, which are placed adjacent to each other in the circumferential direction. Each secondary elastic body is placed between the corresponding primary partition and the corresponding secondary partition, which are placed adjacent to each other in the circumferential direction. The corresponding primary elastic body and the adjacent secondary elastic body, which are placed adjacent to each other in the circumferential direction, are connected to each other through a primary bridge. The corresponding secondary elastic body and the adjacent primary elastic body, which are placed adjacent to each other in the circumferential direction, are connected to each other through a secondary bridge.

JP2013-050207A (corresponding to US2013/0035192A1) discloses two types of drive force transmission apparatuses (referred to as first and second prior art techniques).

The output gear 17 of the drive force transmission apparatus of the first prior art technique includes a gear tooth forming portion 53, a first shaft portion (not shown), and a tilted groove (not shown). The gear tooth forming portion 53 is configured into a cylindrical tubular form and is engageable with the pinion gear 16. The first shaft portion is configured into a cylindrical tubular form and is placed on a radially inner side of the gear tooth forming portion 53 to extend in the axial direction of the output gear 17. The tilted groove is configured into a spiral form (a skew form) and is formed in an inner peripheral surface of the first shaft portion (more specifically, a hole wall surface of a through-hole that extends through the first shaft portion).

Furthermore, the coupling 18 of the first prior art technique includes a second shaft portion and an engaging pin. The second shaft portion is fitted into the through-hole of the first shaft portion of the output gear 17. The engaging pin projects from an outer peripheral surface of a distal end part of the second shaft portion.

The through-hole extends through the inside of the first shaft portion such that the second shaft portion of the coupling 18 is insertable into the through-hole from one end side (inserting side) of the first shaft portion toward the other end side of the first shaft portion. The through-hole extends along a central axis of the first shaft portion.

Now, an assembling procedure of the drive force transmission apparatus of the first prior art technique will be briefly described.

First of all, in a state where the rubber cushion 19 is installed to the output gear 17, at the time of installing the second shaft portion of the coupling 18 into the through-hole of the output gear 17, the engaging pin of the coupling 18 is moved from a start end to a terminal end of the tilted groove, so that the engaging pin of the coupling 18 is moved through the tilted groove.

At this time, the primary elastic bodies and the secondary elastic bodies of the rubber cushion 19 rotate the output gear 17 relative to the coupling 18, so that the rubber cushion 19 is elastically deformed in a twisting direction about the rotational axis of the drive force transmission apparatus.

Then, when the engaging pin is moved beyond the tilted groove, each of the primary and secondary elastic bodies is elastically restored to its original form, so that the output gear 17 is rotated relative to the coupling 18 in an opposite direction, which is opposite from the twisting direction of the primary and secondary elastic bodies of the rubber cushion 19. Thereby, the engaging pin is returned to a position, at which an engaging portion, which is formed in an opening edge part of the through-hole at the opposite side of the through-hole that is opposite from the inserting side, is engageable with the engaging pin.

In this way, the engaging pin can limit movement of the output gear 17 and the rubber cushion 19 relative to the coupling 18. Thereby, it is possible to limit unintentional disassembling or an unintentional positional deviation of the components of the drive force transmission apparatus at the time of transportation, the time of component assembling, or the time of operation of the drive force transmission apparatus.

Next, the drive force transmission apparatus of the second prior art technique will be described. The second shaft portion, which is fitted into the through-hole of the output gear 17, is formed in the coupling 18 of the drive force transmission apparatus of the second prior art technique. A plurality of resilient engaging pieces (snap fit parts) is formed in the distal end side of the second shaft portion. The resilient engaging pieces are resiliently radially inwardly deformed at the time of moving in the through-hole. Thereafter, when the resilient engaging pieces are moved beyond the through-hole, the resilient engaging pieces are resiliently restored. Thereby, the resilient engaging pieces are engaged with the engaging portion, which is formed in the opening edge part of the through-hole at the opposite side that is opposite from the inserting side.

At this time, the output gear 17 is urged by the elastic restoring force of the respective primary and secondary elastic bodies of the rubber cushion 19 toward the opposite side, which is opposite from the inserting side of the through-hole, so that an engaging part of each resilient engaging piece always contacts the engaging portion, which is formed in the opening edge part of the through-hole. Thereby, it is possible to limit movement of the output gear 17 and the rubber cushion 19 relative to the coupling 18 in the direction of the rotational axis of the drive force transmission apparatus, so that unintentional disassembling of the drive force transmission apparatus can be limited.

In the drive force transmission apparatus of the first prior art technique, when the actuator is stopped and is left under a cold environment in a twisted state where the rubber cushion 19 is twisted after the operation of the actuator, the rubber cushion 19 is hardened while maintaining the twisted state. At this time, when the engaging pin of the coupling 18 is moved to the terminal end of the through-hole of the output gear 17, which is used at the time of fitting the output gear 17 and the coupling 18 together, the engaging pin may be disengaged from the engaging portion formed in the opening edge part of the through-hole and may enter the inside of the through-hole upon application of vibrations generated at the time of starting the engine. When the engaging pin enters the inside of the through-hole, an engaging state between the pinion gear 16 and the output gear 17 is changed. This will result in generation of an excess stress to the output gear 17 to disadvantageously cause breakage of output gear teeth of the output gear 17 or a reduction in the lifetime of the output gear 17.

Furthermore, in the drive force transmission apparatus of the second prior art technique, in order to limit the disengagement of the resilient engaging pieces caused by the low temperature and the vibrations, the snap fit structure is used. However, due to the snap fit structure, the rigidity of the rotatable shaft portion is reduced. Thereby, when the torque is applied to the output gear 17, the resilient engaging pieces cannot withstand the applied force and are tilted. As a result, the tooth contact surfaces between the pinion gear 16 and the output gear will be changed.

For example, an excessive stress may be generated due to a decrease in the contact surface area of each of the output gear teeth. Also, an excessive stress may be generated due to a change from a line-to-line contact of a pinion gear tooth surface of the pinion gear relative to an output gear tooth surface of the output gear to a point-to-point contact of the pinion gear tooth surface of the pinion gear relative to the output gear tooth surface of the output gear. When the excessive stress is generated, it will disadvantageously cause breakage of the output gear teeth of the output gear 17 or a reduction in the lifetime of the output gear 17.

SUMMARY

The present disclosure addresses the above disadvantage.

According to the present disclosure, there is provided a drive force transmission apparatus that transmits a drive force of an electric motor to a shaft of a driven subject. The drive force transmission apparatus includes a first rotatable member, a second rotatable member, and a shock absorbing member. The first rotatable member includes a gear tooth forming portion, which is configured into a tubular form and is engageable with a motor-side gear that is rotated upon receiving the drive force of the electric motor. The second rotatable member couples between the shaft and the first rotatable member to enable integral rotation of the shaft and the first rotatable member. The shock absorbing member is made of a rubbery elastic material. The shock absorbing member is placed between the first rotatable member and the second rotatable member and is elastically deformable in a twisting direction about a rotational axis of the first rotatable member and the second rotatable member. The first rotatable member includes a first shaft portion and a through-hole. The first shaft portion is configured into a tubular form and extends in the direction of the rotational axis of the first rotatable member. The first shaft portion is located on a radially inner side of the gear tooth forming portion. The through-hole extends through the first shaft portion to communicate between one end surface and another end surface of the first shaft portion in the direction of the rotational axis of the first rotatable member. The second rotatable member includes a second shaft portion that is fitted into the through-hole from one end side to another end side of the through-hole in the direction of the rotational axis of the second rotatable member. The second shaft portion includes a resilient projection that projects outwardly in a radial direction, which is perpendicular to the direction of the rotational axis of the second rotatable member, from an outer peripheral surface of the second shaft portion, which is located at another end side of the second shaft portion that is opposite from one end side of the second shaft portion where the one end side of the through-hole is placed. The resilient projection is resiliently inwardly deformed in the radial direction at least during movement of the resilient projection along the another end side of the through-hole at a time of fitting the second shaft portion into the through-hole. The resilient projection is resiliently outwardly restored and is engaged to an opening end surface of the through-hole, which is formed at the another end side of the through-hole in the first shaft portion, after passing through the through-hole at the time of fitting the second shaft portion into the through-hole.

BRIEF DESCRIPTION OF THE DRAWINGS

The drawings described herein are for illustration purposes only and are not intended to limit the scope of the present disclosure in any way.

FIG. 10A is a front view of the coupling of the first embodiment;

FIG. 10B is a side view of the coupling of the first embodiment;

DETAILED DESCRIPTION

Figure 1:
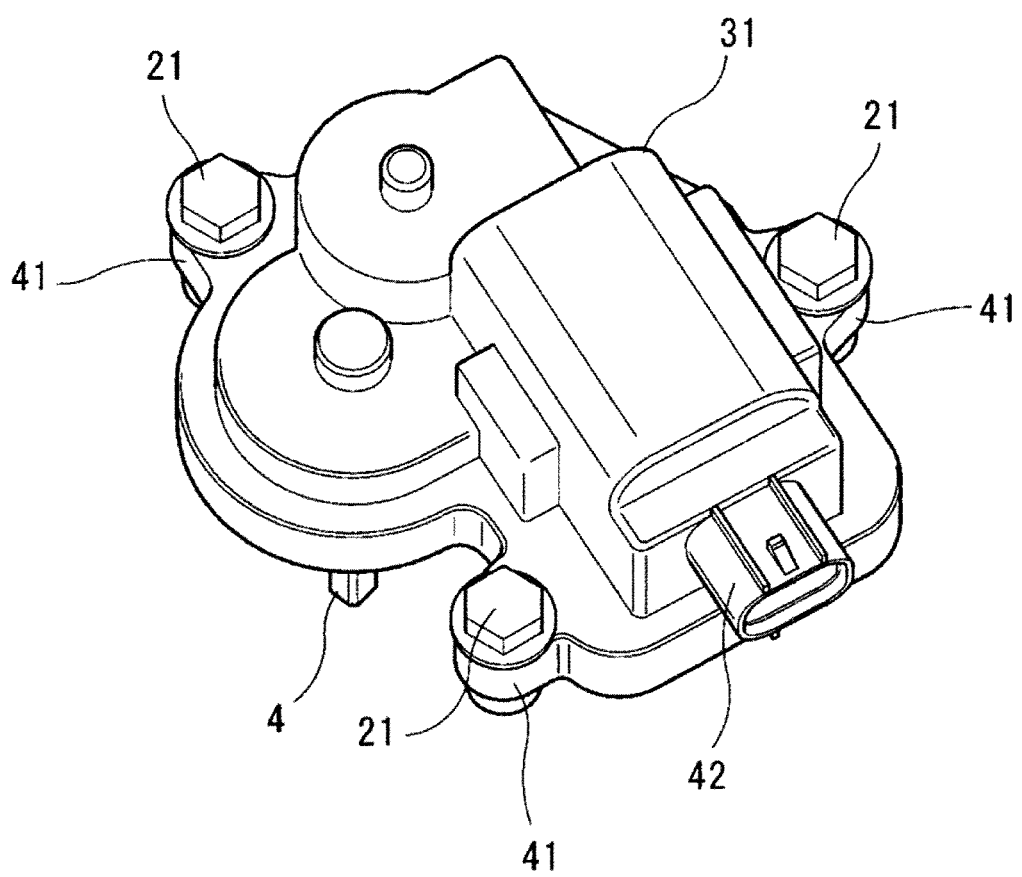
FIG. 1 is a perspective view of an electric actuator according to a first embodiment of the present disclosure.
Figure 2:
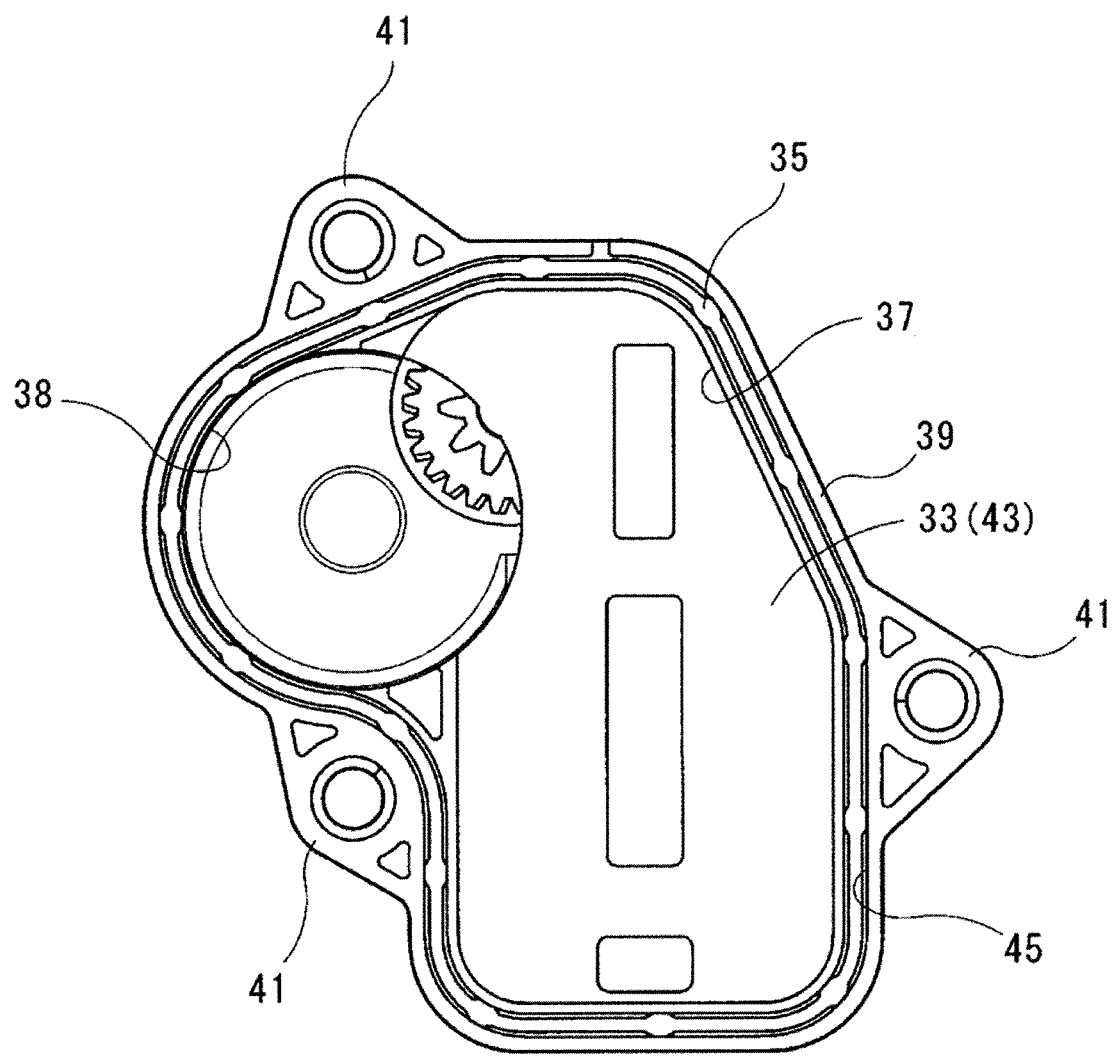
FIG. 2 is a plan view of the electric actuator according to the first embodiment.

Various embodiments of the present disclosure will be described with reference to the accompanying drawings.

First Embodiment

FIGS. 1 to 10B show a gear shaft coupling unit, in which a drive force transmission apparatus according to a first embodiment of the present disclosure is applied. In the following description of the first embodiment, components, which are the same as those of the first and second prior art techniques of FIG. 13 discussed above, will be indicated by the same reference numerals as those of FIG. 13 for the sake of convenience.

An actuator of the present embodiment is an electric actuator that has functional components received in a housing fixed to a support portion 2 of an intake manifold 1, which is a stationary member of an internal combustion engine that drives a vehicle (e.g., an automobile).

The electric actuator includes an electric motor (hereinafter simply referred to as a motor) M, a speed reducing mechanism, and the gear coupling unit (hereinafter simply referred to as a coupling unit). The motor M generates a rotational drive force (torque), which drives a tumble control valve (specifically, tumble valves 3 and a valve shaft 4 of the tumble control valve) to rotate the tumble control valve. The speed reducing mechanism reduces a speed of rotation transmitted from a motor shaft 5 of the motor M. The coupling unit transmits the rotational drive force of the motor M to the valve shaft 4 of the tumble valves 3 through the speed reducing mechanism.

A return spring (not shown), which generates a spring force (resilient force) that urges the tumble valves 3 in a full opening direction (or a full closing direction) relative to the valve shaft 4, is received in an inside of the intake manifold 1 or an inside of the housing of the electric actuator.

Furthermore, the coupling unit serves as the drive force transmission apparatus of the present disclosure and is the coupling mechanism that couples between an output gear 6, which is an output portion of the speed reducing mechanism, and the valve shaft 4 of the tumble control valve.

The coupling unit includes the output gear 6, a gear shaft coupling (hereinafter referred to as a coupling) 7, and a rubber cushion (serving as a shock absorbing member) 8. The output gear 6 is configured into a double cylindrical tubular form and is engaged with, i.e., is meshed with the pinion gear 16 of the speed reducing mechanism, such that the output gear 6 is rotated by the pinion gear 16. The coupling 7 couples between the valve shaft 4 and the output gear 6 to enable integral rotation of the valve shaft 4 and the output gear 6. The rubber cushion 8 is made of a rubbery elastic material (elastomer) and is placed between the output gear 6 and the coupling 7.

The engine includes a plurality of cylinders and is formed as a multi-cylinder gasoline engine (inline-four engine) that generates an output drive force by a heat energy that is obtained through combustion of a gas mixture of clean air (intake air), which is filtered through an air cleaner, and fuel, which is injected from an injector (a fuel injection valve), in a combustion chamber of each cylinder. Here, it should be noted that the engine of the present disclosure is not limited to the multi-cylinder gasoline engine and may be alternatively a multi-cylinder diesel engine.

The intake manifold 1 is connected to an intake port of each cylinder of the engine. An intake conduit, in which an intake air passage is formed, is connected to an upstream end of the intake manifold 1.

An exhaust manifold (not shown) is connected to an exhaust port of each cylinder. An exhaust conduit, in which an exhaust passage is formed, is connected to a downstream end of the exhaust manifold.

The intake manifold 1 is made of, for example, synthetic resin. The intake manifold 1 includes the support portion (fastening portion) 2, to which the electric motor M is fixed with a plurality of screws 21. A plurality of nuts 22 is insert-molded in this support portion 2.

A connecting end surface is formed in an actuator side surface of the support portion 2 of the intake manifold 1, and a housing, which receives each functional component of the electric actuator, is connected to this connecting end surface of the intake manifold 1. The connecting end surface of the intake manifold 1 is a planar surface that is opposed to a connecting end surface of the housing such that a minute gap is interposed between the connecting end surface of the intake manifold 1 and the connecting end surface of the housing. Furthermore, an opening 23, which is configured into a circular form, is formed in the support portion 2 of the intake manifold 1. The opening 23 communicates between the inside of the intake manifold 1 and the outside of the intake manifold 1.

The intake manifold 1 includes a surge tank and a plurality of intake branch conduits. The surge tank reduces or limits pressure fluctuation of the intake air, which has passed through a throttle body (not shown) that receives a throttle valve in a manner that enables opening and closing of the throttle valve. The intake branch conduits are parallel to each other and are arranged one after another in a direction of a row of the cylinders.

An intake branch flow passages is formed in each of the intake branch conduits and is communicated with the combustion chamber and an intake port of the corresponding cylinder of the engine. The intake branch flow passages are branched at an intake branching portion (surge tank) placed at the upstream end of the intake manifold 1 and are connected to the cylinders, respectively.

Figure 13:
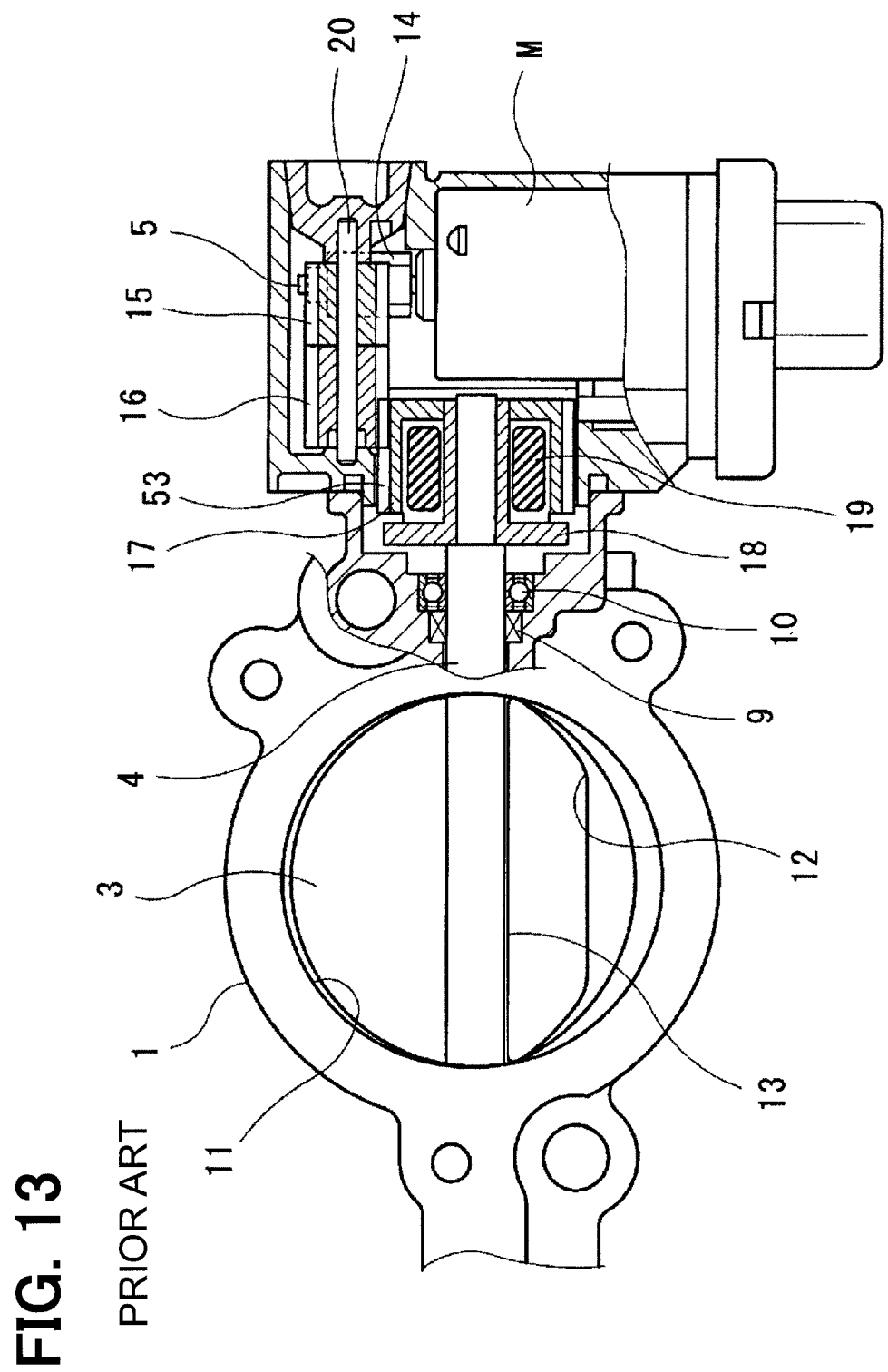
FIG. 13 is a partial cross-sectional view of an intake system of an internal combustion engine in first and second prior art techniques.

In an inside of each intake branch conduit, a partition (partitioning portion) 13, such as a partition wall, is provided to partition the intake branch flow passage of the intake branch conduit into two intake branch flow passages, i.e., a first intake branch flow passage 11 and a second intake branch flow passage 12 (see FIG. 13).

The tumble control valve includes the multiple tumble valves 3 and the valve shaft 4. Each tumble valve 3 opens and closes the first intake branch flow passage 11 of the corresponding intake branch conduit. The valve shaft 4 is made of metal and extends in a direction of a rotational axis of the tumble valves 3.

The tumble valves 3 serve as driven subjects of the present disclosure. The tumble valves 3 are rotatable butterfly valves (plate valves), which are arranged one after another and are coupled together by the single valve shaft 4 that extends through the tumble valves 3 (see FIG. 13).

When the tumble control valve is fully closed, the first intake branch flow passage 11 of each intake branch conduit is closed. At this time, the intake air passes only through the second intake branch flow passage 12, which is opened, in the intake branch flow passage of each intake branch conduit, so that a flow of the intake air is biased to an upper portion of the intake branch flow passage, and thereby a tumble flow circulates in the combustion chamber of the corresponding cylinder around an axis perpendicular to an axis of the cylinder.

When the tumble control valve is fully opened, the intake branch flow passage of each of the intake branch conduits is fully opened.

At this time, it should be noted that each tumble valve 3 of the tumble control valve may be set to have an intermediate opening degree where the tumble valve 3 is held in an intermediate operational position and is thereby half opened.

The valve shaft 4 serves as a shaft of the driven subject(s) of the present disclosure. The valve shaft 4 is a rotatable shaft (an output shaft of the electric actuator), which extends in a direction perpendicular to a flow direction of the intake air in the intake branch flow passage of each of the intake branch flow conduits at the intake manifold 1. The valve shaft 4 extends linearly in the direction of the rotational axis of the valve shaft 4, which is parallel to the direction of the row of the intake branch flow passages, i.e., the direction of the row of the cylinders of the engine.

The valve shaft 4 is a single drive shaft, which extends through the tumble valves 3, so that the valve shaft 4 couples all of the tumble valves 3 to integrally rotate the tumble valves 3.

In the electric actuator, a torque transmission mechanism (a coupling unit) is interposed between the valve shaft 4 and the output portion of the speed reducing mechanism. The torque transmission mechanism (the coupling unit) transmits a torque of the motor M from the output portion of the speed reducing mechanism to the valve shaft 4.

The valve shaft 4 is made of metal and is configured such that a cross sectional area of the valve shaft 4 is configured into a circular form (but a portion of the valve shaft 4 has a polygonal cross section). The valve shaft 4 includes a first projecting shaft portion and a second projecting shaft portion, which are located on one end side and another end side (hereinafter referred to as the other end side), respectively, of the valve shaft 4 in the direction of the rotational axis. A valve holding portion is placed between the first projecting shaft portion and the second projecting shaft portion in the valve shaft 4, and the tumble valves 3 are fixed to the valve holding portion by press fitting.

The first projecting shaft portion is a projection, which is located on the one end side of the valve holding portion in the direction of the rotational axis and has a cross section that is configured into a circular form. The first projecting shaft portion is rotatably received in a first bearing hole of a first bearing support portion of the intake manifold 1.

The second projecting shaft portion is a projection, which is located on the other end side of the valve holding portion in the direction of the rotational axis and has a cross section that is configured into a circular form. The second projecting shaft portion is rotatably received in a second bearing hole of a second bearing support portion of the intake manifold 1.

An extended portion (an engaging shaft portion 24) of the valve shaft 4, which is extended from the second projecting shaft portion toward the other end side in the direction of the rotational axis, has a cross section that is configured into a polygonal form and is projected outwardly from the second bearing support portion. The extended portion (the engaging shaft portion 24) is coupled to the electric actuator.

The electric actuator includes the functional components, which are received in the housing fixed to the support portion 2 of the intake manifold 1.

The housing includes an actuator case (hereinafter referred to as a case) 31, a motor cover (hereinafter referred to as a cover) 33, and a gasket 35. The case 31 is configured into a cup form and receives the motor M, the speed reducing mechanism, the coupling unit and the return spring (serving as the functional components). The cover 33 includes a plurality of lock arms 32 that are engaged to a plurality of engaging projections (not shown), respectively, of the case 31 by snap fitting. A resilient member 34 is configured into a rectangular parallelepiped form and resiliently supports the motor M at a location between the case 31 and the cover 33. The gasket 35 is configured into a ring form and airtightly seals the minute gap between the support portion 2 of the intake manifold 1 and the case 31.

The case 31 is integrally formed (i.e., seamless and continuously formed) by synthetic resin that has a dielectric property. The case 31 includes a recess, which is placed between the case 31 and the cover 33 and receives the functional components of the electric actuator.

The case 31 includes a peripheral wall portion 36, two openings 37, 38 and an opening peripheral edge portion 39. The peripheral wall portion 36 is configured into a tubular form and surrounds the functional components of the electric actuator. The openings 37, 38 open at one end side of the peripheral wall portion 36 to receive the motor M, the speed reducing mechanism and the coupling unit into a receiving chamber of the case 31 at the time of assembly. The peripheral edge portion 39 is configured into a ring form and circumferentially surrounds the openings 37, 38.

One of the openings 37, 38, more specifically the opening 37 is closed with the cover 33. The opening 38 is coaxial with the opening 23, which opens in the connecting end surface (an installation seat surface) of the support portion 2 of the intake manifold 1.

The case 31 includes a plurality of installation bosses 41 and a connector 42. The bosses 41 are used to fix the housing, more specifically the case 31 to the support portion 2 of the intake manifold 1. The connector 42 is provided to make an external electrical connection. Specifically, the connector 42 connects between the motor M and an external circuit.

The opening peripheral edge portion 39 of the case 31 and an end surface (a planar surface) of each of the installation bosses 41 form a connecting portion (the installation surface of the case 31), which is joined to the connecting end surface of the support portion 2 of the intake manifold 1 with a plurality of screws 21.

The cover 33 is made of synthetic resin or metal and is integrally formed (i.e., seamlessly and continuously formed). The cover 33 includes a cover plate portion 43, which closes the opening 37 of the case 31.

The cover 33 includes the lock arms 32, each of which projects from the cover plate portion 43 toward a bottom portion side of the case 31 and is formed as a resilient engaging piece that is resiliently deformable (resiliently flexible) in a thickness direction of the lock arm 32. An engaging projection 44 is formed in each of the lock arms 32. The engaging projections 44 are engaged to the engaging projections of the case 31, which are formed in an inner surface of the peripheral wall portion 36 of the case 31, by snap fitting.

The gasket 35 is made of a rubbery elastic material (elastomer) and is integrally formed (i.e., seamlessly and continuously formed). The gasket 35 is installed to an installation groove 45 of the opening peripheral edge portion 39 of the case 31. The gasket 35 forms an airtight seal portion, which tightly contacts the installation seat surface of the support portion 2 of the intake manifold 1 and airtightly seals the minute gap between the installation seat surface of the support portion 2 of the intake manifold 1 and an opposing end surface of the cover plate portion 43 of the cover 33.

The receiving chamber, which is formed between the case 31 and the cover 33, particularly a receiving chamber that receives the motor M, is provided with a damper spring (leaf spring) 46, which is configured into a thin plate form and limits vibrations the motor M.

The more M is received and is held in the receiving chamber of the case 31. The motor M is a brushed DC motor, which includes an inner rotor that is rotatably placed on a radially inner side of an outer stator. Specifically, the motor M includes an armature, a stator, a brush holder, and first and second brushes. The armature includes a motor shaft 5, which linearly extends in a direction of a rotational axis of the motor shaft 5. The stator is configured into a tubular form and surrounds the armature in a circumferential direction (a motor circumferential direction). The brush holder is fixed to the stator. The first and second brushes are supported by the brush holder and are urged against a commutator of the armature to supply an electric power to an armature coil.

The first brush is connected to a cathode (positive terminal) of an external electric power source (a battery), which is installed in the vehicle (e.g., the automobile), through an electric power supply line that includes a first brush terminal 47, and a first motor terminal (not shown) of the connector 42 that is provided to form an external electrical connection. The second brush is connected to an anode of the external electric power source (the battery) through an electric power supply line that includes a second brush terminal 47, and a second motor terminal (not shown) of the connector 42.

The motor M, which is the drive source of the electric actuator, is electrically connected to the external electric power source (the battery) through a motor drive circuit, which is electronically controlled by an engine control unit (ECU) that is also referred to as an electronic control device.

The ECU has a microcomputer, which at least includes a CPU, a ROM and a RAM.

When an ignition switch of the vehicle is turned on (IG ON), the ECU controls the electric power supply to the motor M, which drives the tumble control valve, based on a control program stored in a memory (e.g., the ROM) of the microcomputer.

At the ECU, sensor signals, which are received from an airflow meter, a crank angle sensor, an accelerator opening degree sensor, a throttle opening degree sensor, an intake air temperature sensor, a coolant temperature sensor and an exhaust gas sensor (an air-fuel ratio sensor, an oxygen concentration sensor), undergo analog-to-digital (A/D) conversion through an A/D converter and are then supplied to the microcomputer.

Next, the details of the speed reducing mechanism will be briefly described with reference to FIGS. 1 to 10B.

The speed reducing mechanism includes a worm gear 14, a helical gear 15, a pinion gear 16 and the output gear 6. The worm gear 14 is configured into a cylindrical tubular form and is fixed to an outer peripheral surface of the motor shaft 5 of the motor M. The helical gear 15 is engaged with the worm gear 14 and is rotated by the worm gear 14. The pinion gear 16 is directly joined to the helical gear 15. The output gear 6 is configured into a cylindrical tubular form and is meshed with the pinion gear 16, so that the output gear 6 is rotated by the pinion gear 16.

The helical gear 15 and the pinion gear 16 are rotatably supported by an outer peripheral surface of a gear shaft (a support shaft of the speed reducing mechanism) 20, which is placed between a first opposing portion and a second opposing portion of the case 31.

The output gear 6, the worm gear 14, the helical gear 15 and the pinion gear 16, which are constituent components of the speed reducing mechanism, are received and are held in the receiving chamber of the case 31.

The worm gear 14 is made of synthetic resin or metal and is integrally formed (i.e., seamlessly and continuously formed). The worm gear 14 is an input gear, which is rotated by the rotational drive force (torque) of the motor M. The worm gear 14 includes a cylindrical boss portion, which is fixed to the outer peripheral surface of the motor shaft 5 of the motor M by, for example, press fitting. A worm gear tooth, which is engageable with the helical gear 15, spirally extends in an outer peripheral surface of the cylindrical boss portion.

The helical gear 15 is made of synthetic resin or metal and is integrally formed. The helical gear 15 includes a cylindrical tubular boss portion, which circumferentially surrounds the gear shaft 20, and is rotatably supported by the outer peripheral surface of the gear shaft 20. Helical gear teeth, which are engageable with the worm gear tooth of the worm gear 14, are arranged one after another in the circumferential direction along the entire outer peripheral surface of the cylindrical boss portion of the helical gear 15.

The pinion gear 16 serves as a motor-side gear of the present disclosure. The pinion gear 16 is made of the synthetic resin or metal and is integrally formed (i.e., seamlessly and continuously formed). Furthermore, the pinion gear 16 has an outer diameter that is smaller than an outer diameter of the helical gear 15, and the pinion gear 16 is directly joined to an end surface of the helical gear 15. Alternatively, the pinion gear 16 may be formed integrally and seamlessly with the helical gear 15 through a resin molding process. In other words, the pinion gear 16 and the helical gear 15 may be seamlessly and continuously formed together from resin. Furthermore, the pinion gear 16 is an intermediate gear that is rotated integrally with the helical gear 15 by the drive force (torque) of the motor M. The pinion gear 16 includes a cylindrical tubular boss portion, which surrounds the gear shaft 20 in the circumferential direction. Pinion gear teeth, which are engageable with the output gear 6, are formed one after another in the circumferential direction through the entire outer peripheral surface of the cylindrical boss portion of the pinion gear 16.

The gear shaft 20 extends in a direction that is perpendicular to the axial direction (the direction of the rotational axis) of the motor shaft 5. One end portion of the gear shaft 20 is securely press fitted into a first engaging recess (not shown), which is formed in a bottom portion of the case 31. Another end portion of the gear shaft 20, which is opposite from the one end portion of the gear shaft 20, is fitted into a second engaging recess (not shown), which is formed in the cover plate portion 43 of the cover 33.

The coupling unit forms the drive force transmission apparatus, which transmits the torque of the motor M from the output gear 6 of the speed reducing mechanism to the valve shaft 4 of the tumble valves 3 through the rubber cushion 8.

Each of the output gear 6 and the coupling 7 is made of synthetic resin or metal and is integrally formed (i.e., seamlessly and continuously formed). Furthermore, the output gear 6 includes a first opposing portion 51, and the coupling 7 includes a second opposing portion 52. The first opposing portion 51 of the output gear 6 is opposed to the second opposing portion 52 of the coupling 7 such that a cushion receiving chamber 49, which receives the rubber cushion 8, is interposed between the first opposing portion 51 and the second opposing portion 52. An opposing surface of the first opposing portion 51 and an opposing surface of the second opposing portion 52 are opposed to each other and are spaced from each other by a predetermined distance (axial direction).

The output gear 6 serves as a first rotatable member of the present disclosure. The output gear 6 includes an output gear tooth forming portion (or simply referred to as a gear tooth forming portion) 53, a first rotatable shaft portion (or simply referred to as a first shaft portion) 54, and a through-hole 55. The output gear tooth forming portion 53 is configured into a cylindrical tubular form and is engageable with the pinion gear 16, which is the motor-side gear that is rotated upon receiving the torque of the motor M. The first rotatable shaft portion 54 is configured into a cylindrical tubular form. Furthermore, the first rotatable shaft portion 54 is placed on a radially inner side of the output gear-tooth forming portion 53 and extends in the axial direction of the output gear 6 (the direction of the rotational axis of the output gear 6). The through-hole 55 extends through the first rotatable shaft portion 54 to communicate between one end surface and another end surface of the first rotatable shaft portion 54 along a central axis of the first rotatable shaft portion 54 in the direction of the rotational axis of the output gear 6.

The cushion receiving chamber 49 is formed in an inside (radially inner side) of the output gear tooth forming portion 53. Furthermore, a plurality of output gear teeth 56 is arranged one after another in the circumferential direction along the entire outer peripheral surface of the output gear tooth forming portion 53 to engage with the pinion gear teeth of the pinion gear 16.

The first rotatable shaft portion 54 is formed integrally in a center part of the opposing surface of the first opposing portion 51 to project from the opposing surface of the first opposing portion 51 toward the second opposing portion 52. In other words, the first rotatable shaft portion 54 seamlessly and continuously extends from the center part of the opposing surface of the first opposing portion 51 toward the second opposing portion 52.

The first rotatable shaft portion 54 is configured into a cylindrical tubular form and surrounds a second rotatable shaft portion (also referred to as a second shaft portion) 61 of the coupling 7. The first opposing portion 51 and the first rotatable shaft portion 54 are rotatably fitted to an outer peripheral surface of the second rotatable shaft portion (the second shaft portion) 61 of the coupling 7. The through-hole 55, which has a circular cross section, is formed in the first opposing portion 51 and the first rotatable shaft portion 54.

The first rotatable shaft portion 54 forms a first engaging portion (a tubular portion), which is fitted to the outer peripheral surface of the second rotatable shaft portion (the second shaft portion) 61 of the coupling 7. A projecting shaft portion 57 is formed integrally with the first rotatable shaft portion 54 (i.e., the projecting shaft portion 57 is formed seamlessly and continuously with the first rotatable shaft portion 54). The projecting shaft portion 57 is configured into a cylindrical tubular form and projects from an outer surface (end surface) of the first opposing portion 51 toward the other end side (the upper side in, for example, FIG. 5) of the output gear 6 in the axial direction.

The through-hole 55 extends linearly through a center part of the first rotatable shaft portion 54 in the direction of the rotational axis of the coupling unit. The through-hole 55 is a receiving hole, which has a circular cross section. The through-hole 55 linearly connects between an opening 58 at the one end side of the through-hole 55 (hereinafter referred to as an inserting side opening, through which the second rotatable shaft portion 61 of the coupling 7 is inserted into the through-hole 55) and an opening 59 of the through-hole 55 at the other end side (hereinafter referred to as an projecting side opening, which is opposite from the inserting side opening 58 and is provided to project the second rotatable shaft portion 61 through the projecting side opening).

Figure 3:
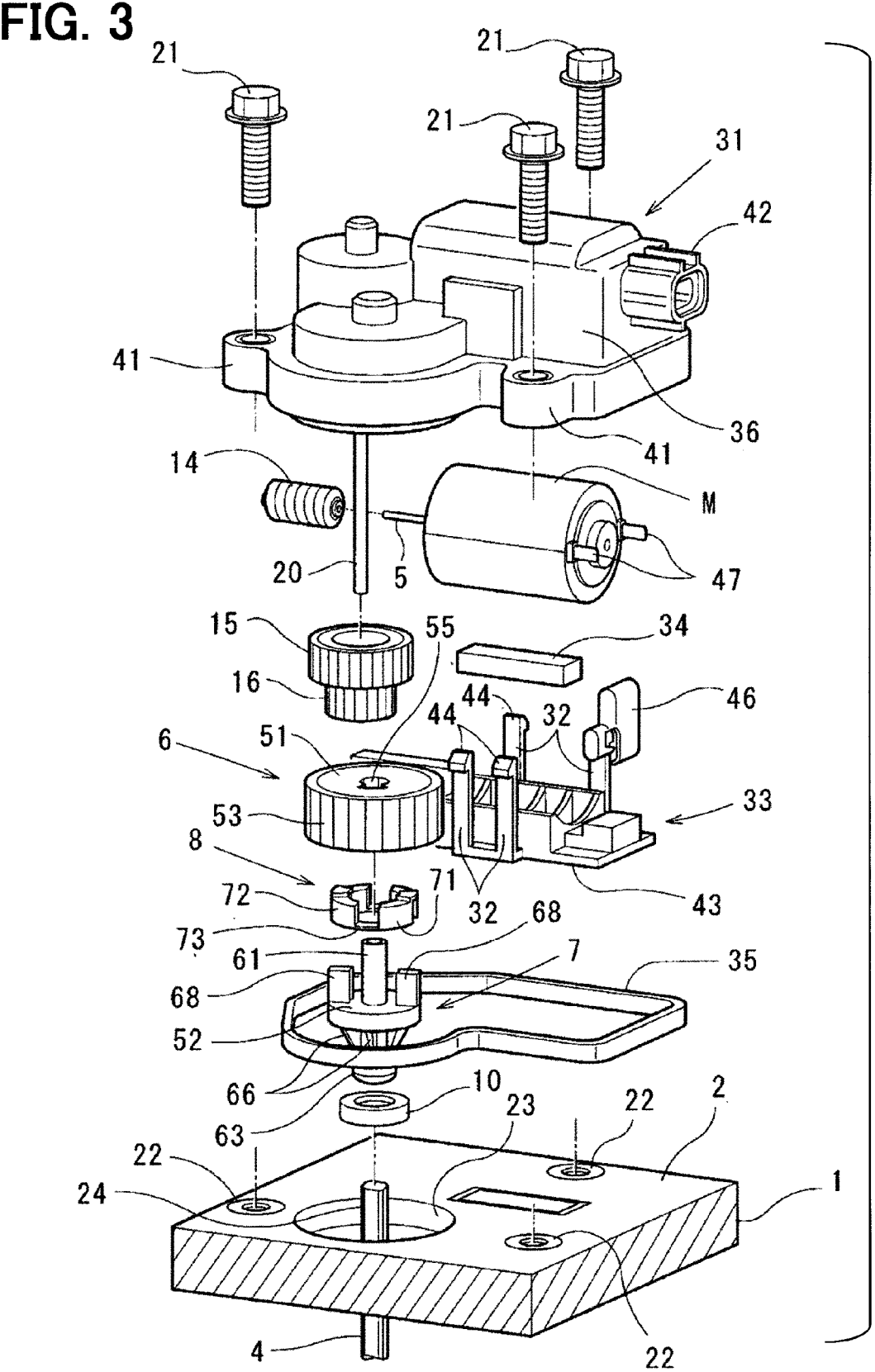
FIG. 3 is an exploded view of the electric actuator according to the first embodiment.

In the output gear 6 shown in FIG. 3, the projecting shaft portion 57 is not depicted for the sake of convenience.

The coupling 7 serves as a second rotatable member of the present disclosure. The coupling 7 is rotatably supported by a bearing support portion (bearing holder), which is formed adjacent to the opening 23 of the intake manifold 1, through a bearing 10.

The coupling 7 includes the second opposing portion 52, the second rotatable shaft portion 61, a block (thick wall portion) 62, and a cylindrical tubular shaft portion 63. The second opposing portion 52 is configured into a circular disk form and forms the cushion receiving chamber 49 between the opposing surface of the second opposing portion 52 and the opposing surface of the first opposing portion 51. The second rotatable shaft portion 61 is configured into a hollow tubular form and projects from a center part of the second opposing portion 52 toward the upper side (the other side of the coupling 7 in the axial direction), as shown in, for example, FIG. 4. The block 62 is formed on a lower side (the one side of the coupling 7 in the axial direction) of the second opposing portion 52, as shown in, for example, FIG. 4. The cylindrical tubular shaft portion 63 projects from a center part of the block 62 toward a lower side (the one side of the coupling 7 in the axial direction), as shown in, for example, FIG. 4. The cylindrical tubular shaft portion 63 has an outer diameter, which is larger than an outer diameter of the second rotatable shaft portion 61.

The second rotatable shaft portion 61 is inserted into the through-hole 55 from the one end side (the inserting side) of the through-hole 55 to the other end side (the projecting side, which is opposite from the inserting side) of the through-hole 55. The second rotatable shaft portion 61 is a second engaging portion (second shaft portion), which is fitted to an inner peripheral surface of the first rotatable shaft portion 54 of the output gear 6.

The block 62 includes a plurality of projecting walls 64, which project outwardly from an outer peripheral surface of the block 62 in the radial direction.

An engaging hole (blind hole) 65, which has a polygonal cross section (more specifically, a rectangular cross section), is formed in the block 62 and the cylindrical tubular shaft portion 63. The engaging shaft portion 24 of the valve shaft 4 is insertable into the engaging hole 65 from the one side of the coupling 7 toward the deep side, i.e., the other side of the coupling 7. A press fitting hole, into which the engaging shaft portion 24 of the valve shaft 4 is press fitted, is formed in a portion of the engaging hole 65 or an entire extent of the engaging hole 65.

In the coupling 7 shown in FIG. 3, the block 62 and the projecting walls 64 are not depicted for the sake of convenience. Furthermore, as shown in FIG. 3, in place of the block 62 and the projecting walls 64, a plurality of ridge ribs 66 may be formed in the outer peripheral surface of the cylindrical tubular shaft portion 63 of the coupling 7. Each ridge rib 66 is a reinforcing rib, which is configured to have a triangular cross section and extends from a lower surface of the second opposing portion 52 to an outer surface of the one end of the cylindrical tubular shaft portion 63.

The output gear 6 includes a plurality (two in this embodiment) of primary barrier walls (partitions) 67, and the coupling 7 includes a plurality (two in this embodiment) of secondary barrier walls (partitions) 68. The primary barrier walls 67 and the secondary barrier walls 68 are alternately arranged one after another in the circumferential direction of the coupling unit.

The primary barrier walls 67 radially project from an inner peripheral surface of the output gear tooth forming portion 53 toward an outer peripheral surface of the first rotatable shaft portion 54. That is, the primary barrier walls 67 radially inwardly project from the radially outer side to the radially inner side. The primary barrier walls 67 are the partitions, which project from the opposing surface of the first opposing portion 51 toward the second opposing portion 52 (the lower side in the drawing).

A wall surface, which limits recessing (resilient deformation) of a corresponding bridge 73 of the rubber cushion 8, is formed in one end side (lower side in the drawing) of each primary barrier wall 67.

The primary barrier walls 67 are arranged one after another at predetermined intervals (e.g., 180 degree intervals) in the circumferential direction of the output gear 6. Each of the primary barrier walls 67 is interposed between corresponding adjacent two of the secondary barrier walls 68.

The details of the output gear 6 will be described later.

The secondary barrier walls 68 are partition walls, which project from the opposing surface of the second opposing portion 52 toward the first opposing portion 51 side (the upper side in the drawing). Each of the secondary barrier walls 68 is a ridge portion, which is configured into an arcuate form. The secondary barrier walls 68 are partially formed in the second opposing portion 52 in the circumferential direction.

As shown in FIG. 3, in the coupling 7, the secondary barrier walls 68 may be radially projected from a position, which is radially outwardly spaced from the second rotatable shaft portion 61 in the second opposing portion 52, toward the radially outer side.

The secondary barrier walls 68 are arranged one after another at predetermined intervals (e.g., 180 degree intervals) in the circumferential direction of the coupling 7. Each of the secondary barrier walls 68 is interposed between corresponding adjacent two of the primary barrier walls 67.

In this way, a portion (primary space portion) of the cushion receiving chamber 49 is formed between each primary barrier wall 67 and a circumferentially adjacent one of the secondary barrier walls 68, which is circumferentially adjacent to the primary barrier wall 67 on one circumferential side of the primary barrier wall 67. Thereby, a plurality (two in this embodiment) of primary space portions is formed. Furthermore, a remaining portion (secondary space portion) of the cushion receiving chamber 49 is formed between each primary barrier wall 67 and a circumferentially adjacent another one of the secondary barrier walls 68, which is circumferentially adjacent to the primary barrier wall 67 on an opposite circumferential side of the primary barrier wall 67. Thereby, a plurality (two in this embodiment) of secondary space portions is formed.

Details of the coupling 7 will be described later.

The rubber cushion 8 is an annular resilient member and serves as the shock absorbing member of the present disclosure. The rubber cushion 8 absorbs a shock (load) torque, which is conducted to the output gear 6 or the coupling 7.

The rubber cushion 8 is made of a rubbery elastic material (elastomer) and is formed integrally (i.e., formed seamlessly and continuously). The rubbery elastic material (elastomer), which forms the rubber cushion 8, is not limited to any particular one as long as the rubber cushion 8 has elasticity in a predetermined elastic region. For example, the rubbery elastic material may be synthetic rubber (e.g., Hydrogenated nitrile butadiene rubber (HNBR), silicone rubber, or fluoro rubber (FPM)) or thermoplastic elastomer, which is a mixture of polypropylene (PP) and ethylene propylene rubber (EPDM).

Alternatively, the rubbery elastic material may be a blend material, in which a plurality of types of synthetic rubbers and/or natural rubbers are blended. An outer shape or a cross sectional shape of the rubber cushion 8 may be freely changed in response to a shape (spatial shape) of the cushion receiving chamber 49, which is formed between the first opposing portion 51 of the output gear 6 and the second opposing portion 52 of the coupling 7.

The rubber cushion 8 includes a plurality (two in this embodiment) of elastic bodies 71, a plurality (two in this embodiment) of elastic bodies 72, a plurality (two in this embodiment) of bridges 73, and a plurality (two in this embodiment) of bridges 74. Each of the elastic bodies 71 is inserted between the corresponding primary barrier wall 67 and the adjacent secondary barrier wall 68, which is located on the counterclockwise side of the corresponding primary barrier wall 67 in FIG. 4. Each of the elastic bodies 72 is interpose between the corresponding primary barrier wall 67 and the corresponding secondary barrier wall 68, which is located on the clockwise side of the corresponding primary barrier wall 67 in FIG. 4. Therefore, the elastic bodies 71 and the elastic bodies 72 are alternately arranged one after another in the circumferential direction. Each of the bridges 73 is located on the one end side (the second opposing portion 52 side) and connects between the corresponding one of the elastic bodies 71 and the circumferentially adjacent one of the elastic bodies 72. Each of the bridges 74 is located on the other end side (the first opposing portion 51 side) and connects between the corresponding one of the elastic bodies 71 and the circumferentially adjacent one of the elastic bodies 72.

The elastic bodies 71 are primary rubbery elastic bodies (thick wall portions), each of which is elastically deformable (compressively deformable) in a twisting direction about the rotational axis of the coupling unit. Each of the elastic bodies 71 is held in the corresponding one of the primary space portions in the cushion receiving chamber 49, which is formed between the first opposing portion 51 of the output gear 6 and the second opposing portion 52 of the coupling 7.

The resilient bodies 72 are secondary rubbery elastic bodies (thick wall portions), each of which is elastically deformable (compressively deformable) in the twisting direction about the rotational axis of the coupling unit. Each of the elastic bodies 72 is held in the corresponding one of the secondary space portions in the cushion receiving chamber 49, which is formed between the first opposing portion 51 of the output gear 6 and the second opposing portion 52 of the coupling 7.

Figure 4:
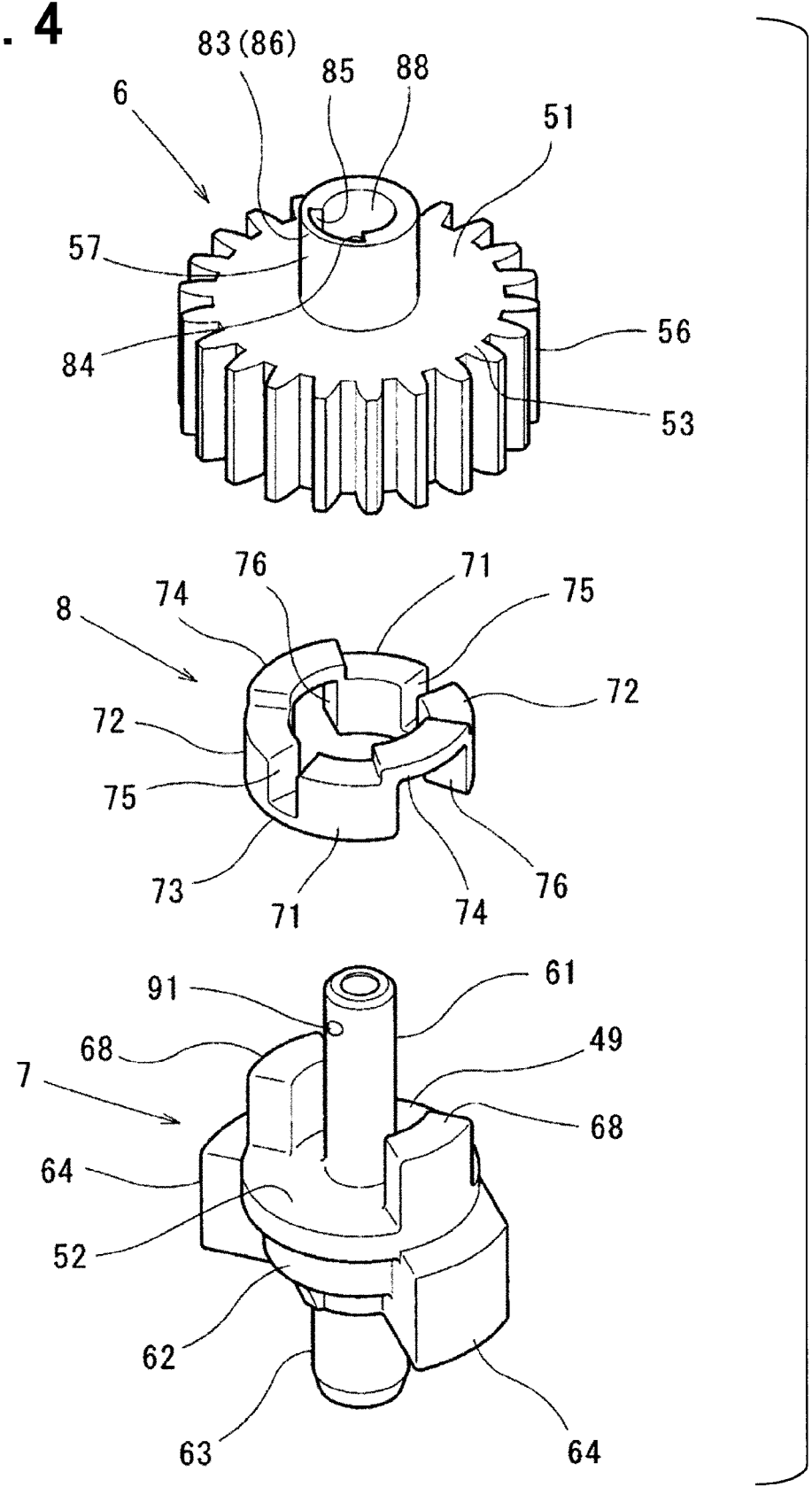
FIG. 4 is a perspective exploded view of a gear shaft coupling unit (a drive force transmission apparatus) according to the first embodiment.
Figure 5:
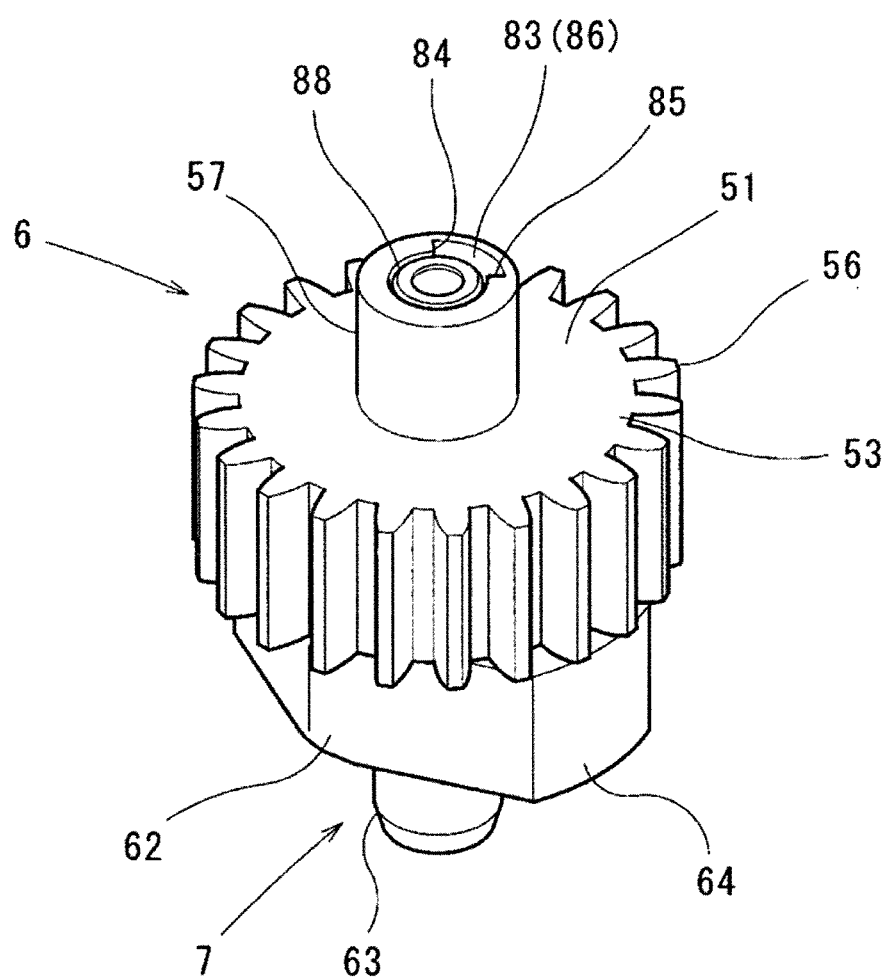
FIG. 5 is a perspective view of the gear shaft coupling unit (the drive force transmission apparatus) according to the first embodiment.

With reference to FIG. 4, each of the bridges 73 is formed as a primary connecting portion (thin wall portion), which connects between the lower end side of the corresponding elastic body 71 and the lower end side of the corresponding elastic body 72 and is configured into a thin plate form that has a thickness smaller than that of the elastic bodies 71, 72 in the direction of the rotational axis. Similar to the elastic bodies 71, 72, the bridges 73 can be compressively deformable in the circumferential direction of the coupling unit.

With reference to FIG. 4, each of the bridges 74 is formed as a secondary connecting portion (thin wall portion), which connects between the upper end side of the corresponding elastic body 71 and the upper end side of the corresponding elastic body 72 and is configured into a thin plate form that has a thickness smaller than that of the elastic bodies 71, 72 in the direction of the rotational axis. Similar to the elastic bodies 71, 72 and the bridges 73, the bridges 74 can be compressively deformable in the circumferential direction of the coupling unit.

Figure 6A:
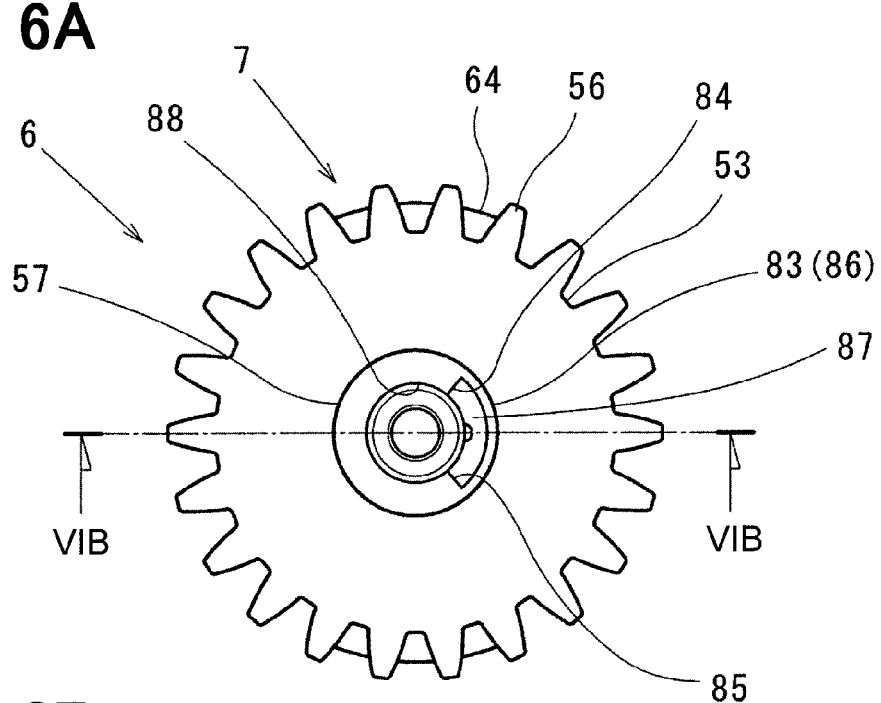
FIG. 6A is a plan view showing the gear shaft coupling unit (the drive force transmission apparatus) according to the first embodiment.
Figure 6B:
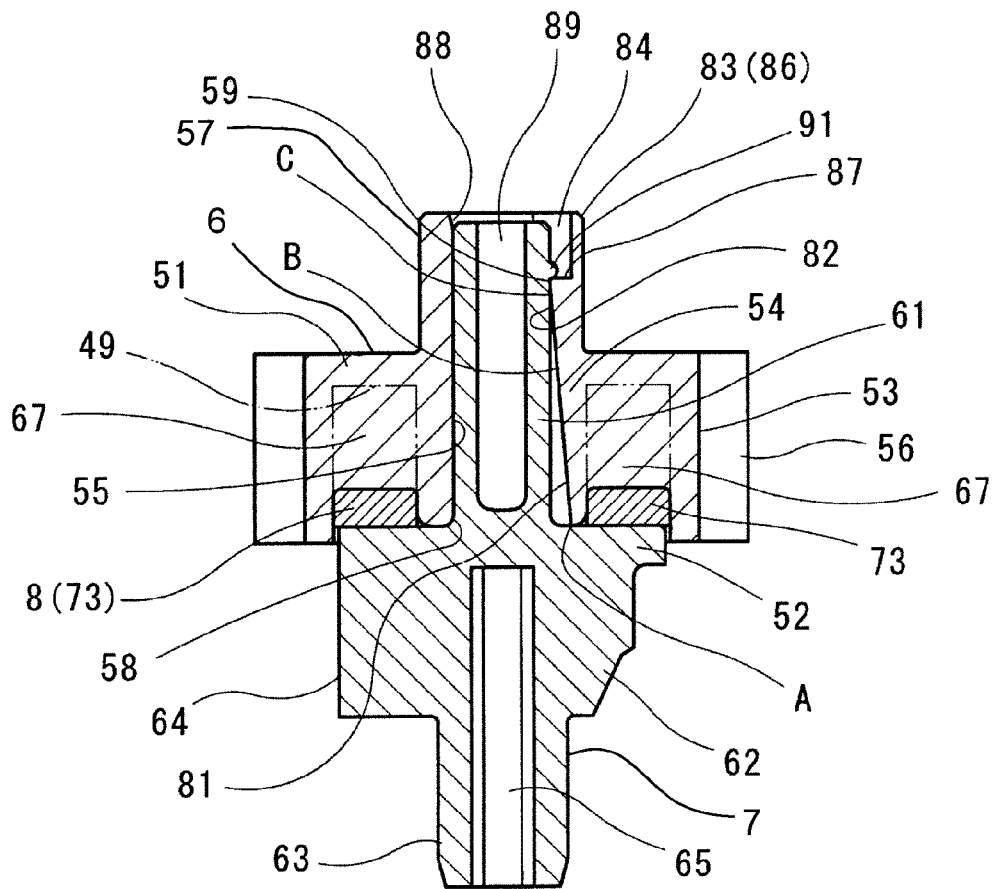
FIG. 6B is a cross-sectional view taken along line VIB-VIB in FIG. 6A.
Figure 7:
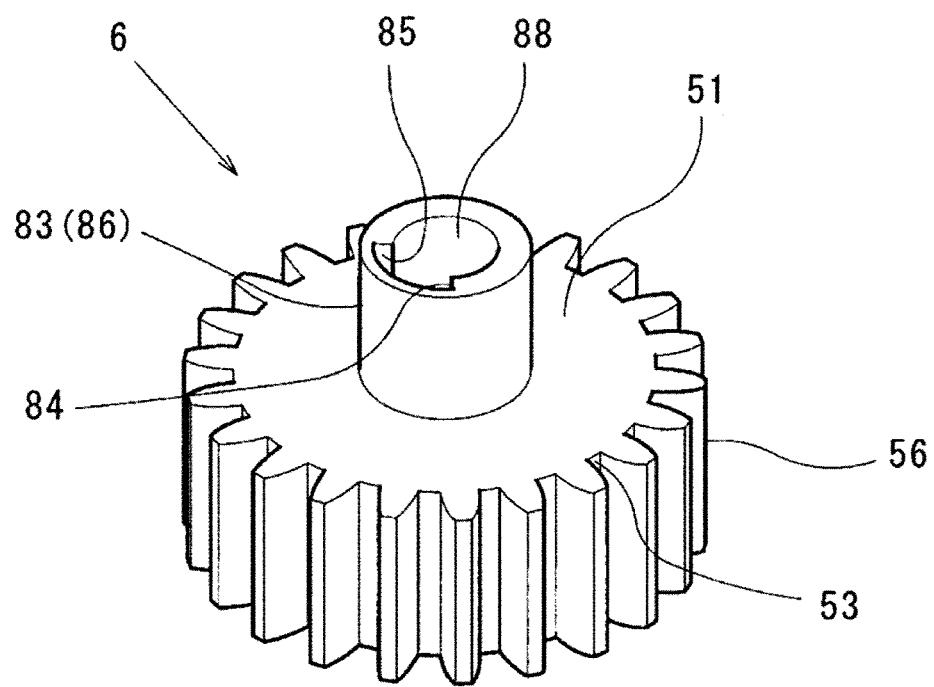
FIG. 7 is a perspective view of an output gear according to the first embodiment.
Figure 8A:
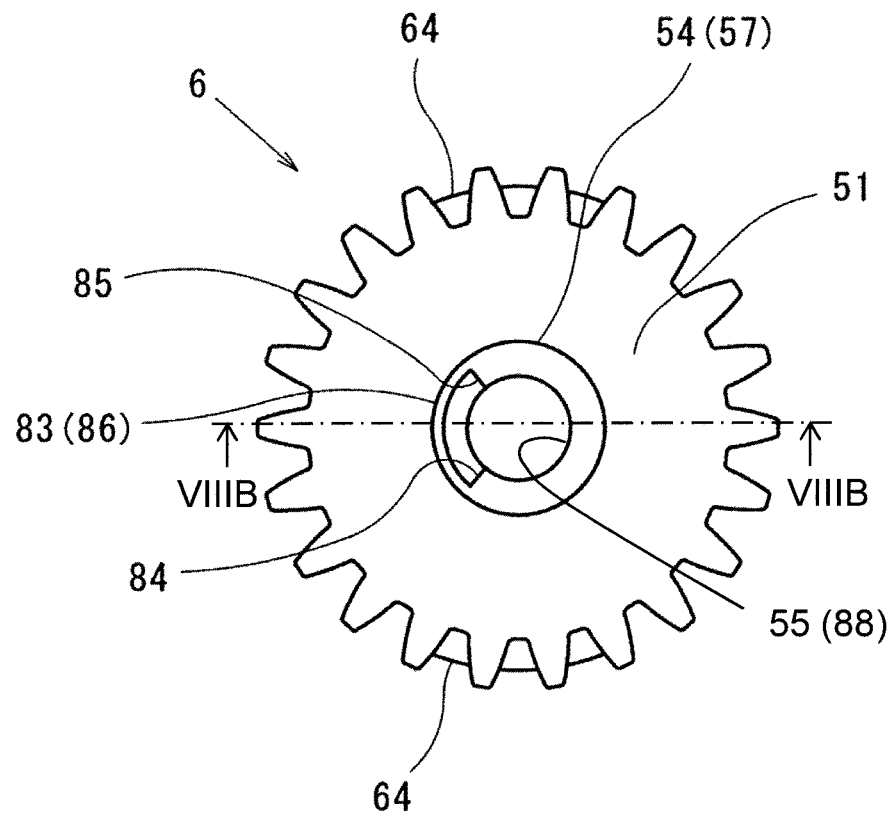
FIG. 8A is a plan view of an output gear according to the first embodiment.
Figure 8B:
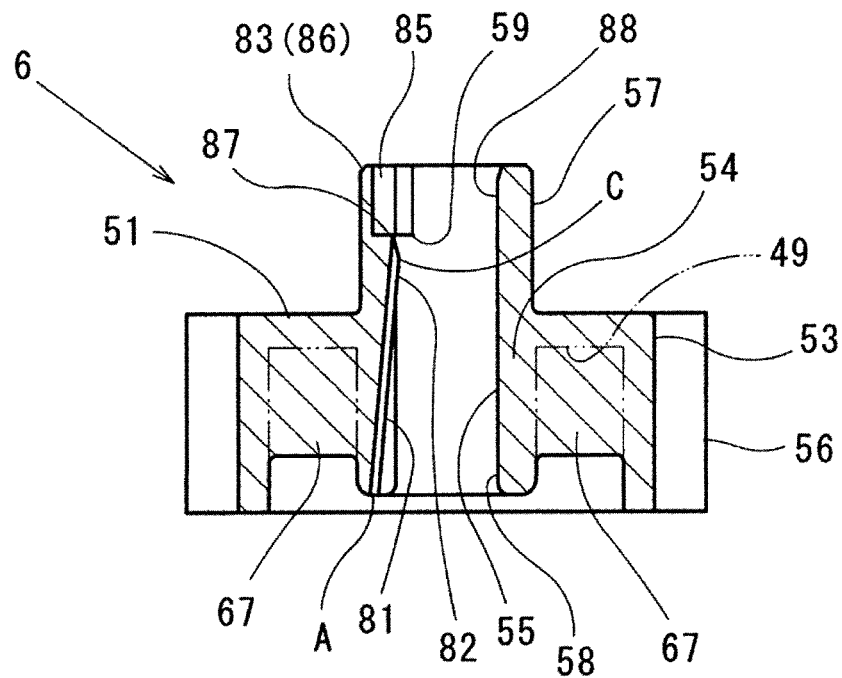
FIG. 8B is a cross sectional view taken along line VIIIB-VIIIB in FIG. 8A.
Figure 9:
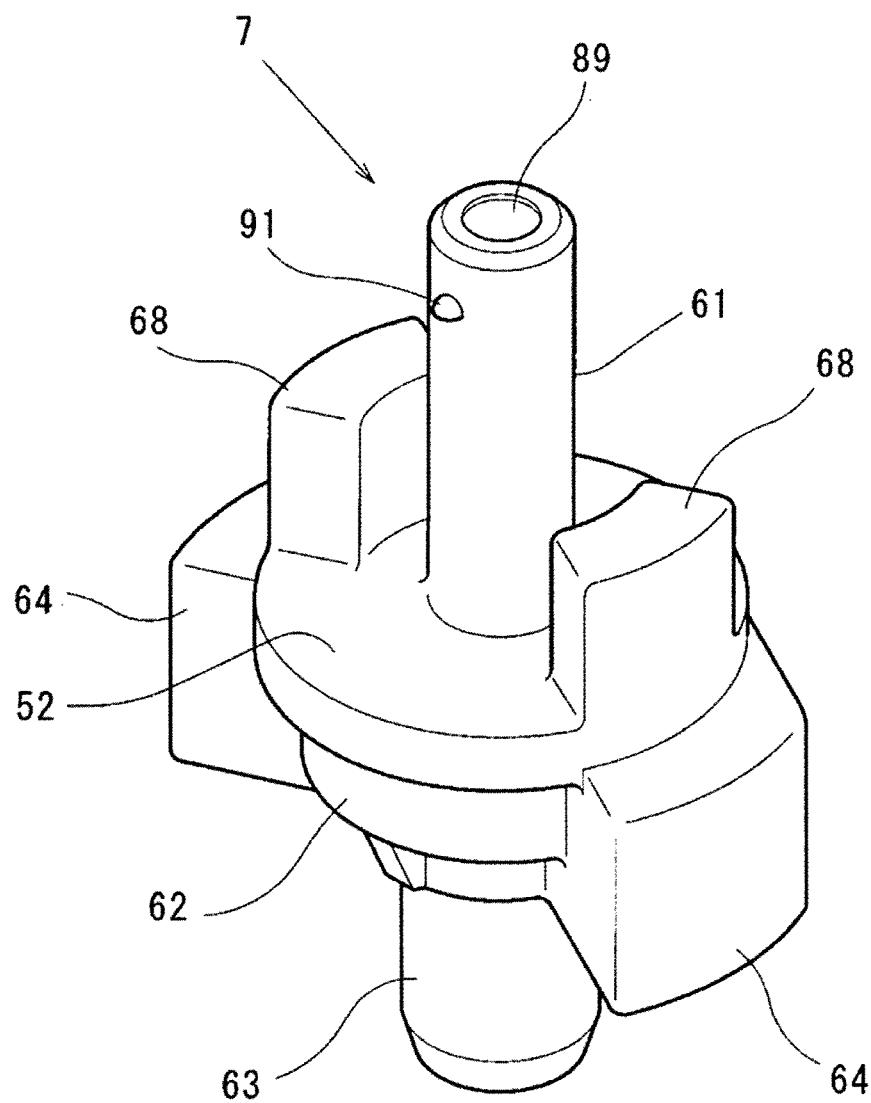
FIG. 9 is a perspective view of a coupling according to the first embodiment.

Here, the rubber cushion 8 includes a plurality of engaging recesses 75 and a plurality of engaging recesses 76. Each of the primary barrier walls 67, which projects downward from the opposing surface of the first opposing portion 51 of the output gear 6 in FIG. 6B, is fitted into a corresponding one of the engaging recesses 75. Furthermore, each of the secondary barrier walls 68, which projects upward from the opposing surface of the second opposing portion 52 of the coupling 7 in FIG. 4, is fitted into a corresponding one of the engaging recesses 76.

Each of the engaging recesses 75 has a primary opening, which is located at the upper side in FIG. 4 in the space defined by the corresponding elastic bodies 71, 72 and the corresponding bridge 73.

Each of the engaging recesses 76 has a secondary opening, which is located at the lower side in FIG. 4 in the space defined by the corresponding elastic bodies 71, 72 and the corresponding bridge 74.

The wall thickness (plate thickness) of each of the bridges 73 may be equal to or different from the wall thickness (plate thickness) of each of the bridges 74. Furthermore, in the rubber cushion 8 shown in FIG. 3, the bridges 74 and the engaging recesses 76 are not depicted for the sake of convenience.

Next, details of the output gear 6 and the coupling 7 of the present embodiment will be described with reference to FIGS. 1 to 10B.

The through-hole 55 is formed to extend through the first rotatable shaft portion 54, and a through-hole 88, which is communicated with the through-hole 55, extends through the projecting shaft portion 57, so that insertion of the second rotatable shaft portion 61 of the coupling 7 into the through-hole 55 from the one end side (the inserting side) to the other end side (the projecting side, which is opposite from the inserting side) of the through-hole 55 is enabled.

The through-hole 55 has a recessed groove 81, which opens in the one end surface of the first rotatable shaft portion 54 (an opening end surface at the one end side of the through-hole 55 in the axial direction) and extends from the inserting side opening 58 toward the deep side, i.e., the other end side of the recessed groove 81 in the axial direction along the central axis of the first rotatable shaft portion 54.

The recessed groove 81 extends in a direction that is tilted relative to the direction of the rotational axis of the first rotatable shaft portion 54.

The recessed groove 81 has a tapered groove bottom surface. A depth (radial depth) of the tapered groove bottom surface progressively decreases from the inserting side opening 58 toward the deep side, i.e., the other end side of the recessed groove 81. The recessed groove 81 extends from the inserting side opening 58 side to the other end side of the recessed groove 81, i.e., to the projecting side opening 59 or a location adjacent to the projecting side opening 59 or a location immediately before the projecting side opening 59.

Furthermore, at the side where the projecting side opening 59 of the through-hole 55 is located, i.e., the deep side of the recessed groove 81 (the other end side of the recessed groove 81, which is opposite from the inserting side opening 58 side), a stress applying portion 82 is formed. The stress applying portion 82 applies a stress to a resilient projection 91, which will be discussed later, within a predetermined elastic region. That is, the stress applying portion 82 applies the stress to the resilient projection 91 to resiliently deform the resilient projection 91. The stress applying portion 82 begins from a location adjacent to an intermediate point B, which is spaced from a start point A of the recessed groove 81 by a predetermined distance (axial distance), and the stress applying portion 82 ends at an end point C of the recessed groove 81, i.e., the projecting side opening 59 or a location adjacent to the end point C of the recessed groove 81.

A limiting portion 83 is formed in the projecting shaft portion 57 to limit relative rotation between the output gear 6 and the coupling 7. The limiting portion 83 includes two limiting walls 84, 85 and an arcuate peripheral wall section 86. The limiting walls 84, 85 are opposed to each other in the circumferential direction, and an arcuate gap is interposed between the limiting walls 84, 85. An angular extent of the arcuate gap corresponds to a maximum twisting angle of each elastic body 71, 72 of the rubber cushion 8, which is twisted at the time of absorbing the shock (load) torque conducted to the output gear 6 or the coupling 7 through elastic displacement of each elastic body 71, 72 of the rubber cushion 8 in the twisting direction of the elastic body 72, 72. The arcuate peripheral wall section 86 extends along an entire extent of the arcuate gap in the circumferential direction on the radially outer side of the arcuate gap.

An engaging portion 87, which is configured into an arcuate form, is formed in the opening end surface of the through-hole 55 located at the other end side, i.e., is formed in an opening peripheral edge part of the arcuate peripheral wall section 86, which is located at a radially inner side area of the arcuate peripheral wall section 86.

Furthermore, the through-hole 88 is formed in the inside of the projecting shaft portion 57. The through-hole 88 of the projecting shaft portion 57 is communicated with the through-hole 55 and extends beyond the projecting side opening 59 of the through-hole 55 in the direction of the rotational axis.

In the output gear 6 shown in FIG. 3, the limiting portion 83 is not depicted for the sake of convenience.

The second rotatable shaft portion 61 of the coupling 7 is made of synthetic resin and is integrally formed (seamlessly and continuously formed). The second rotatable shaft portion 61 is configured into a hollow cylindrical tubular form (or a cylindrical solid form) that includes a center hole (blind hole) 89, which has an opening at an upper end surface of the center hole 89 and extends in a direction of a central axis of the second rotatable shaft portion 61 from this opening toward the deep side, i.e., the lower side in FIG. 9.

The resilient projection 91 is formed in the second rotatable shaft portion 61 such that the resilient projection 91 projects outwardly in the radial direction, which is perpendicular to the direction of the rotational axis of the second rotatable shaft portion 61, from an outer peripheral surface of the second rotatable shaft portion 61, which is located at the other end side of the second rotatable shaft portion 61.

The resilient projection 91 is configured into a semispherical form (or a form of a quarter sphere that has a planar surface, which forms a step 92 discussed below) that has a progressively decreasing projecting amount, which is measured in the radial direction and progressively decreases from the one end side to the other end side of the second rotatable shaft portion 61 in the direction of the rotational axis of the second rotatable shaft portion 61. The resilient projection 91 includes the step 92. In the direction of the rotational axis of the second rotatable shaft portion 61, the step 92 interferes with the engaging portion 87, which is the opening end surface of the through-hole 55 formed at the other end side of the through-hole 55 in the first rotatable shaft portion 54. The step 92 has a planar surface (step surface), which extends in a common extending direction that is common with the planar surface of the engaging portion 87, i.e., which is parallel with the planar surface of the engaging portion 87 to enable the step 92 to effectively contact the engaging portion 87. The location of the step 92 in the resilient projection 91, which is configured into the semispherical form, is not limited to any particular location in the direction of the rotational axis of the second rotatable shaft portion 61. Furthermore, the step surface of the step 92 may be a protruding curved surface, a recessing curved surface, or a tilt surface. Further alternatively, the resilient projection 91 may be a semispherical form without having the step 92 or a streamline form (projection) or a cylindrical form or a polygonal column form.

The resilient projection 91 displaceably contacts the recessed groove 81 when the second rotatable shaft portion 61 is fitted into the through-hole 55 of the first rotatable shaft portion 54. Furthermore, the resilient projection 91 receives the stress, which is within the predetermined elastic region, and is thereby resiliently inwardly deformed in the radial direction during the movement of the resilient projection 91 along the deep side of the recessed groove 81 (the other end side of the recessed groove 81) and the stress applying portion 82 at the time of fitting the second rotatable shaft portion 61 into the through-hole 55 of the first rotatable shaft portion 54. Thereby, the resilient projection 91 is inwardly displaced in the radial direction, which is perpendicular to the direction of the rotational axis of the second rotatable shaft portion 61.

The resilient projection 91 is a stopped portion, which is stopped by the engaging portion 87. Specifically, the resilient projection 91 is resiliently inwardly deformed in the radial direction, which is perpendicular to the direction of the rotational axis of the second rotatable shaft portion 61, at the location adjacent to the deep side of the recessed groove 81 (the other end side of the recessed groove 81) during the movement of the resilient projection 91 along the recessed groove 81 of the through-hole 55. Thereafter, the resilient projection 91 is resiliently outwardly restored and is engaged to the engaging portion 87 after passing through the other end side of the through-hole 55. Thereby, the resilient projection 91 is stopped and is retained by the engaging portion 87 to limit displacement of the second rotatable shaft portion 61 toward the one end side of the through-hole 55.

The material of the second rotatable shaft portion 61 and the resilient projection 91 is not limited to the synthetic resin material. That is, the material of the second rotatable shaft portion 61 and the resilient projection 91 may be any other suitable material as long as such a material has resiliency within the predetermined elastic region.

Next, a manufacturing method of the coupling unit of the present embodiment, particularly, a manufacturing method of the output gear 6 and the coupling 7 will be briefly described.

A manufacturing process of the output gear 6 and the coupling 7, i.e., a process of injection molding for integrally molding each of the output gear 6 and the coupling 7 is performed through a mold die closing step, an injecting step, a pressure holding step, a molding die opening step and a product removing step, as is known in the art of the injection molding.

First of all, a cavity (not shown), which corresponds to a product shape of the output gear 6, is formed in a corresponding injection molding die device (including a stationary die, a movable die as well as a core die if necessary).

Next, the thermoplastic resin is heated and is molten. The molten resin is pressurized and is injected into the cavity of the injection molding die device through a gate to fill the cavity with the molten resin. At this time, the molten resin, which flows from the gate into the cavity, is progressively filled in the cavity from a location that is furthermost from the gate (the most downstream side of the cavity in the flow direction of the molten resin).

Thereafter, when the resin is cooled and is solidified, the product is removed from the injection molding die device.

By using the above injection molding method, the output gear 6, which is made of the synthetic resin and includes the output gear tooth forming portion 53, the first rotatable shaft portion 54 and the through-hole 55, is integrally molded.

Next, similar to the injection molding method of the output gear 6, a cavity (not shown), which corresponds to a product shape of the coupling 7, is formed in a corresponding injection molding die device (including a stationary die, a movable die as well as a core die if necessary).

Next, the thermoplastic resin is heated and is molten. The molten resin is pressurized and is injected into the cavity of the injection molding die device through a gate to fill the cavity with the molten resin. At this time, the molten resin, which flows from the gate into the cavity, is progressively filled in the cavity from a location that is furthermost from the gate (the most downstream side of the cavity in the flow direction of the molten resin).

Thereafter, when the resin is cooled and is solidified, the product is removed from the injection molding die device.

By using the above injection molding method, the coupling 7, which is made of the synthetic resin and includes the second rotatable shaft portion 61, the block 62, the cylindrical tubular shaft portion 63, and the resilient projection 91, is integrally molded.

Next, an assembling method of the coupling unit to the valve shaft 4 of the tumble control valve of the present embodiment will be briefly described with reference to FIGS. 1 to 10B.

In the present embodiment, in advance to the assembling of the coupling unit to the valve shaft 4 of the tumble control valve, as shown in FIGS. 4 to 6B, the output gear 6, the coupling 7 and the rubber cushion 8 are assembled to form a subassembly (an output gear assembly). Thereafter, as shown in FIG. 3, the coupling unit (the output gear assembly) is fitted and is secured to the engaging shaft portion 24 of the valve shaft 4.

First of all, the rubber cushion 8 is assembled to the coupling 7. Specifically, the rubber cushion 8, which is configured into the annular form, is fitted to the second rotatable shaft portion 61 of the coupling 7 from the distal end side toward the opposing surface of the second opposing portion 52 of the coupling 7. At this time, the engaging recesses 76 are fitted to the secondary barrier walls 68, respectively, of the coupling 7, so that the rubber cushion 8 is placed on the second opposing portion 52 of the coupling 7 (first step).

Next, the output gear 6 is installed to the coupling 7 such that the rubber cushion 8 is clamped between the first opposing portion 51 of the output gear 6 and the second opposing portion 52 of the coupling 7. Specifically, the first rotatable shaft portion 54 of the output gear 6 is fitted to the outer peripheral surface of the second rotatable shaft portion 61 of the coupling 7 such that the primary barrier walls 67 of the output gear 6 are fitted into the engaging recesses 75, respectively, of the rubber cushion 8. That is, the first rotatable shaft portion 54 of the output gear 6 is fitted to the second rotatable shaft portion 61 of the coupling 7 such that the rubber cushion 8 is clamped between the first rotatable shaft portion 54 of the output gear 6 and the second rotatable shaft portion 61 of the coupling 7.

Thereafter, the resilient projection 91, which projects outwardly from the outer peripheral surface of the second rotatable shaft portion 61 of the coupling 7 in the radial direction at the other end side (the distal end side) of the second rotatable shaft portion 61, is positioned to the inserting side opening 58 of the through-hole 55 of the output gear 6, particularly, the distal end surface of the second rotatable shaft portion 61 of the coupling 7 is position to the start point A of the recessed groove 81 of the through-hole 55 of the output gear 6 (second step).

Next, the first opposing portion 51 of the output gear 6 is pushed toward the second opposing portion 52 of the coupling 7, so that the resilient projection 91 is smoothly moved from the start point A to the intermediate point B in the recessed groove 81.

Thereafter, the resilient projection 91 passes the stress applying portion 82 from the intermediate point B to the end point C. At the time of passing through the stress applying portion 82, the resilient projection 91 contacts (interferes with) the stress applying portion 82 (the tapered groove bottom surface) at the recessed groove 81. Thus, the resilient projection 91 is urged inwardly in the radial direction by the stress applying portion 82 at the time of passing through the stress applying portion 82. Thereby, the resilient projection 91 is inserted (advanced) to the location adjacent to the projecting side opening 59 of the through-hole 55, which is the deep side of the recessed groove 81, while the resilient projection 91 is resiliently inwardly deformed in the radial direction, which is perpendicular to the direction of the rotational axis of the second rotatable shaft portion 61, upon receiving the stress in the predetermined elastic region from the stress applying portion 82 at the time of passing through the stress applying portion 82.

Then, in the state where the resilient projection 91 axially projects from the projecting side opening 59 of the through-hole 55 after passing through the recessed groove 81 upon the movement of the resilient projection 91 to the end point C of the recessed groove 81, i.e., in the state where the resilient projection 91 is resiliently outwardly restored after passing through the through-hole 55 from the one end side to the other end side of the through-hole 55, the step 92 of the resilient projection 91, which projects outwardly in the radial direction from the outer peripheral surface of the second rotatable shaft portion 61 of the coupling 7 at the other end side of the second rotatable shaft portion 61, engages the opening side end surface (the engaging portion 87) of the through-hole 55 at the other end side of the through-hole 55, as shown in FIG. 6B. Thereby, the resilient projection 91 is retained, i.e., stopped by the opening side end surface (the engaging portion 87) of the through-hole 55 in such a manner that removal of the second rotatable shaft portion 61 of the coupling 7 from the through-hole 55 of the output gear 6 is limited in the state where the rubber cushion 8 is clamped between the first opposing portion 51 of the output gear 6 and the second opposing portion 52 of the coupling 7.

Thereby, the output gear 6, the coupling 7 and the rubber cushion 8, which are the functional components of the coupling unit (the output gear assembly), are assembled together before the time of assembling these components to the valve shaft 4 of the tumble control valve (third step).

Next, the coupling unit is installed to the valve shaft 4 of the tumble control valve. Specifically, the distal end of the engaging shaft portion 24 of the valve shaft 4 is positioned relative to the engaging hole 65, which opens at the end surface of the cylindrical tubular shaft portion 63 of the coupling 7.

Then, the cylindrical tubular shaft portion 63 of the coupling 7 is pushed to insert the engaging shaft portion 24 of the valve shaft 4 into the engaging hole 65 of the coupling 7 toward the deep side of the engaging hole 65. The press fitting hole is formed in the portion of the engaging hole 65 or the entire extent of the engaging hole 65, and the engaging shaft portion 24 of the valve shaft 4 is press fitted into the engaging hole 65, so that removal of the engaging shaft portion 24 of the valve shaft 4 from the engaging hole 65 of the coupling 7 is limited.

In this way, the assembling of the valve shaft 4 of the tumble control valve with the coupling unit (the output gear assembly) is completed (fourth step).

Here, it should be noted that the valve shaft 4 of the tumble control valve may be assembled to the coupling 7 to enable integral rotation of the valve shaft 4 and the coupling 7 before the assembling of the output gear 6, the coupling 7 and the rubber cushion 8 together. Furthermore, in a case where the material of the block 62 and the cylindrical tubular shaft portion 63 of the coupling 7 is the synthetic resin, the engaging shaft portion 24 of the valve shaft 4 may be insert-molded into the block 62 and the cylindrical tubular shaft portion 63 of the coupling 7.

Now, advantages of the first embodiment will be described.

As discussed above, the electric actuator of the present embodiment includes the coupling unit, which transmits the torque of the motor M to the valve shaft 4 of the tumble control valve.

This coupling unit includes: the output gear 6, which is made of the synthetic resin and is rotated by the pinion gear 16 of the speed reducing mechanism meshed with the output gear 6; the coupling 7, which is made of the synthetic resin and is coupled to the output gear 6 to enable integral rotation of the coupling 7 and the output gear 6; and the rubber cushion 8, which is made of the rubbery elastic material and absorbs the shock (load) torque conducted to the output gear 6 or the coupling 7.

The output gear 6 and the coupling 7 include the first opposing portion 51 and the second opposing portion 52, respectively, which are opposed to each other while the cushion receiving chamber 49 is placed between the first opposing portion 51 and the second opposing portion 52.

The output gear 6 includes the first rotatable shaft portion 54, which is configured into the hollow cylindrical tubular form and projects at the center part of the first opposing portion 51 from the one end side to the other end side in the direction of the rotational axis of the output gear 6. Furthermore, the projecting shaft portion 57 projects from the first rotatable shaft portion 54 toward the other end side.

The through-hole 55 extends through the first rotatable shaft portion 54, and the through-hole 88, which is continuous from the through-hole 55, extends through the projecting shaft portion 57, so that insertion of the second rotatable shaft portion 61 of the coupling 7 into the through-hole 55 from the one end side (the inserting side) to the other end side of the through-hole 55 is enabled. The engaging portion 87, which is configured into the arcuate form, is formed in the opening end surface of the through-hole 55 located at the other end side of the through-hole 55, and the step 92 of the resilient projection 91 is engaged to the engaging portion 87 to limit removal of the second rotatable shaft portion 61 from the through-hole 55.

Furthermore, the coupling 7 includes the second rotatable shaft portion 61, which is configured into the hollow cylindrical tubular form and projects at the center part of the second opposing portion 52 of the coupling 7 toward the distal end side (the other end side that is opposite from the one end side) in the direction of the rotational axis of the coupling 7.

The second rotatable shaft portion 61 includes the resilient projection 91. The resilient projection 91 is resiliently inwardly deformed in the radial direction, which is perpendicular to the direction of the rotational axis of the second rotatable shaft portion 61, at the deep side of the recessed groove 81 of the through-hole 55 when the resilient projection 91 is moved in the recessed groove 81 from the one end side toward the other end side of the through-hole 55. Thereafter, the resilient projection 91 is resiliently outwardly restored and is engaged to the engaging portion 87 of the output gear 6 after the time of passing through the through-hole 55.

Thereby, according to the present embodiment, the removal of the second rotatable shaft portion 61 of the coupling 7 from the through-hole 55 of the output gear 6 can be eliminated or alleviated. Also, the removal of the resilient projection 91 of the coupling 7 from the engaging portion 87 of the output gear 6 can be eliminated or alleviated. Furthermore, the tilting of the output gear 6 relative to the meshing surfaces of the pinion gear 16 due to the insufficient rigidity of the second rotatable shaft portion 61 of the coupling 7 can be eliminated or alleviated. Thus, even in the case where the rubber cushion 8 is hardened due to the disposal of the rubber cushion 8 under the cold environment after the stopping of the engine in the state where the rubber cushion 8 is twisted upon the operation of the electric actuator, it is possible to limit the removal of the resilient projection 91 from the engaging portion 87 by the vibrations of the engine at the time of starting the engine.

Therefore, since the movement of the resilient projection 91 into the through-hole 55 is limited, the engaging state between the pinion gear teeth of the pinion gear 16 and the output gear teeth 56 of the output gear tooth forming portion 53 of the output gear 6 does not change (does not change even upon elapsing of, for example, months or years). Therefore, the application of the excess stress to the output gear tooth forming portion 53 of the output gear 6 is limited, and thereby breakage of the output gear teeth 56 of the output gear tooth forming portion 53 and a reduction in the lifetime of the output gear 6 can be limited without causing an increase in the costs.

Furthermore, the resilient projection 91 maintains the shape of the semispherical form indicated in FIGS. 5, 6A-6B, 9 and 10A-10B as long as the stress generated upon the resilient deformation at the time of assembly is within the elastic region thereof.

Furthermore, when the configuration of the resilient projection 91 is made to, for example, the semispherical form of the first embodiment or the tapered form of the third embodiment, the structure of the molding die device, which requires the core molding die, can be simplified. Also, since the moldability of the coupling 7 can be improved, it is possible to reduce the costs. Furthermore, in the case of the drive force transmission apparatus of the second prior art technique discussed above, the insert die (the core die) needs to be moved in three directions. Thus, in comparison to the drive force transmission apparatus of the second prior art technique, the manufacturing costs can be reduced.

Furthermore, the groove configuration of the recessed groove 81 of the through-hole 55 of the output gear 6 is not limited any particular shape, such as a tapered form, a semicircular form, a linear form, a curved line form or a spiral form, as long as the stress generated in the recessed groove 81 of the output gear 6 and the resilient projection 91 of the coupling 7 is within the elastic region at the time of fitting the first rotatable shaft portion 54 of the output gear 6 and the second rotatable shaft portion 61 of the coupling 7 together.

Furthermore, at the time of fitting the first rotatable shaft portion 54 of the output gear 6 and the second rotatable shaft portion 61 of the coupling 7 together, the stress generated in the recessed groove 81 of the output gear 6 and the resilient projection 91 of the coupling 7 can be reduced. Thereby, it is possible to reduce the amount of the required carbon fibers or the amount of required glass fibers, and/or it is possible to change a base material to another material, which has the lower costs and lower strength. In this way, the manufacturing costs can be reduced. Specifically, polyamide resin (PA) having the glass fibers (30% by weight), which is used as a molding resin material of the output gear and the coupling in the first prior art technique art and the second prior art technique, can be changed to polybutylene terephthalate (PBT), which is a molding resin material and is less expensive in comparison to the polyamide resin (PA). Therefore, the manufacturing costs can be reduced in the first prior art technique and the second prior art technique.

Second Embodiment

Figure 11:
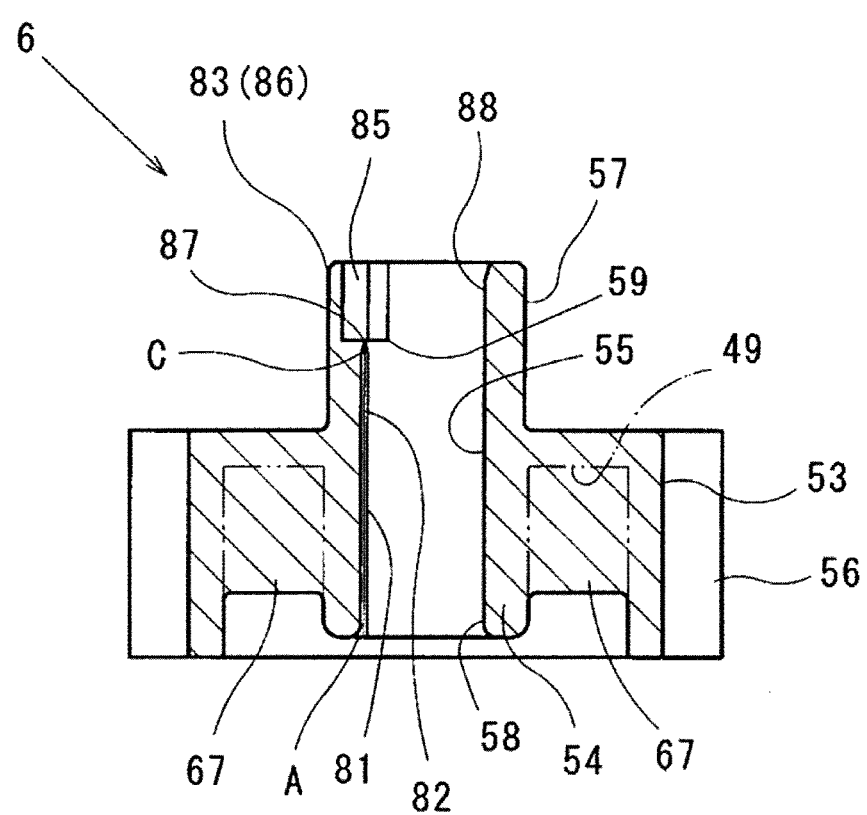
FIG. 11 is a cross sectional view of an output gear according to a second embodiment of the present disclosure.

FIG. 11 indicates a coupling unit applied to a drive force transmission apparatus according a second embodiment of the present disclosure.

The second embodiment is a modification of the first embodiment. In the following discussion, the components, which are similar to those of the first embodiment, will be indicated by the same reference numerals and will not be described further for the sake of simplicity.

The coupling unit of the present embodiment includes the output gear 6, the coupling 7 and the rubber cushion 8. The output gear 6 is made of the synthetic resin and is meshed with the pinion gear 16 of the speed reducing mechanism, such that the output gear 6 is rotated by the pinion gear 16. The coupling 7, which is similar to the coupling 7 of the first embodiment, is made of the synthetic resin and is coupled with the output gear 6 to rotate integrally with the output gear 6. The rubber cushion 8, which is similar to the rubber cushion 8 of the first embodiment, is held in the cushion receiving chamber 49, which is formed between the first opposing portion 51 of the output gear 6 and the second opposing portion 52 of the coupling 7.

The output gear 6 of the present embodiment includes the first rotatable shaft portion 54, which is configured into the hollow cylindrical tubular form and projects at the center part of the first opposing portion 51 from the one end side to the other end side in the direction of the rotational axis of the output gear 6. Furthermore, the first rotatable shaft portion 54 is formed integrally with the projecting shaft portion 57, which is configured into the hollow cylindrical tubular form and extends from the first rotatable shaft portion 54 toward the other end side. The through-hole 55 extends through the first rotatable shaft portion 54, and the through-hole 88, which is communicated with the through-hole 55, extends through the projecting shaft portion 57, so that insertion of the second rotatable shaft portion 61 of the coupling 7 into the through-hole 55 from the one end side (the inserting side) to the other end side of the through-hole 55 is enabled.

The through-hole 55 includes the recessed groove 81. The recessed groove 81 opens in the opening end surface of the through-hole 55 located at the one end side in the axial direction and extends from the inserting side opening 58 toward the deep side (the other end side) in the direction of the central axis (the direction of the rotational axis) of the first rotatable shaft portion 54.

The engaging portion 87, which is configured into the arcuate form, is formed in the opening end surface of the through-hole 55 located at the other end side in the axial direction. When the step 92 of the resilient projection 91 is engaged to the engaging portion 87, the removal of the second rotatable shaft portion 61 from the through-hole 55 is limited.

The recessed groove 81 of the through-hole 55 extends in the direction of the rotational axis of the first rotatable shaft portion 54.

The recessed groove 81 has the groove bottom surface, which has the groove depth that is measured in the radial direction and is constant from the inserting side opening 58 to the deep side (the other end side) of the recessed groove 81. The recessed groove 81 extends from the inserting side opening 58 side to the other end side of the recessed groove 81, i.e., to the projecting side opening 59 or a location adjacent to the projecting side opening 59 or a location immediately before the projecting side opening 59.

Furthermore, the stress applying portion 82 is formed in the through-hole 55. The stress applying portion 82 applies the stress to the resilient projection 91 within the predetermined elastic region. That is, the stress applying portion 82 applies the stress to the resilient projection 91 to resiliently deform the resilient projection 91.

The stress applying portion 82 extends from the start point A (the inserting side opening 58 of the recessed groove 81) or the location adjacent to the start point A to the end point C (the projecting side opening 59) or the location adjacent to the end point C. That is, the stress applying portion 82 extends through this section (the point A to the point C). Specifically, when the resilient projection 91 of the coupling 7 passes this section (the point A to the point C) of the recessed groove 81 of the through-hole 55, the resilient projection 91 is resiliently inwardly deformed in the radial direction of the second rotatable shaft portion 61. Thereafter, when the resilient projection 91 is projected from the recessed groove 81 of the through-hole 55 after passing through the section (A-C), the resilient projection 91 is resiliently outwardly restored and is engaged to the engaging portion 87 after the time of passing through the through-hole 55.

As discussed above, the drive force transmission apparatus of the present embodiment can provide advantages, which are similar to those of the first embodiment.

Third Embodiment

Figure 12:
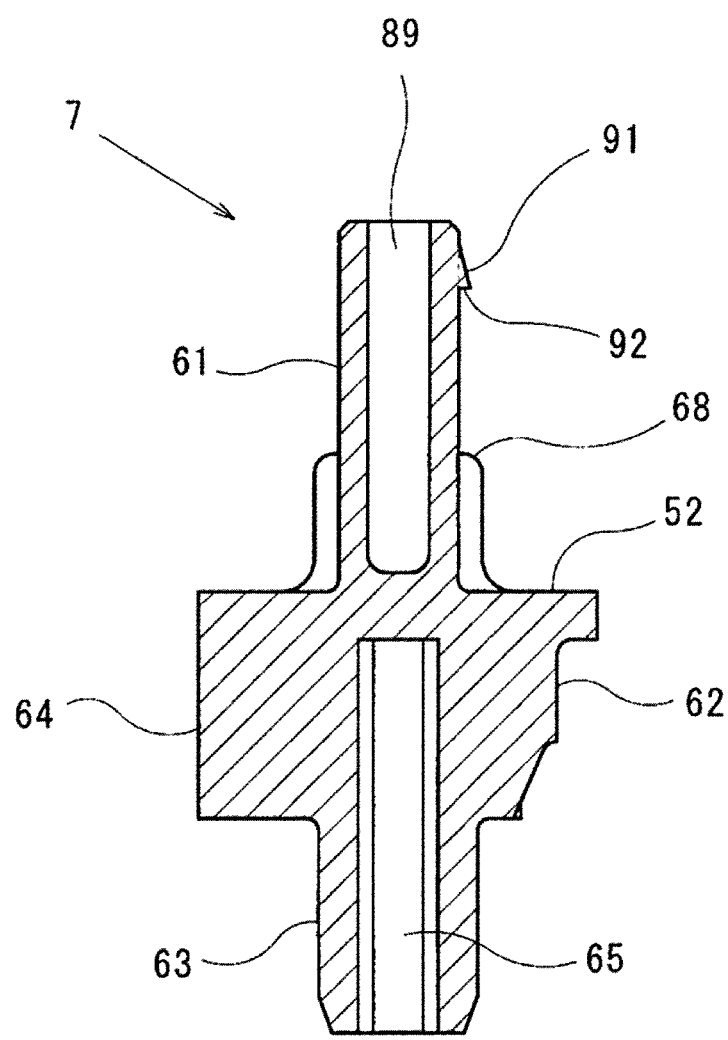
FIG. 12 is a cross-sectional view of a coupling according to a third embodiment of the present disclosure.

FIG. 12 indicates a coupling unit applied to a drive force transmission apparatus according a third embodiment of the present disclosure.

The third embodiment is a modification of the first embodiment. In the following discussion, the components, which are similar to those of the first and second embodiments, will be indicated by the same reference numerals and will not be described further for the sake of simplicity.

The third embodiment is similar to the first embodiment except the configuration of the resilient projection 91 of the coupling 7. According to the third embodiment, similar to the first embodiment, the coupling 7 of the present embodiment includes the second rotatable shaft portion 61, which is configured into the hollow cylindrical tubular form and projects at the center part of the second opposing portion 52 of the coupling 7 toward the distal end side (the other end side that is opposite from the one end side) in the direction of the rotational axis of the coupling 7. The resilient projection 91 outwardly projects from the outer peripheral surface of the second rotatable shaft portion 61 at the other end side (the distal end side) of the second rotatable shaft portion 61 in the radial direction, which is perpendicular to the rotational axis of the second rotatable shaft portion 61.

The resilient projection 91 is configured into a tapered form (having a tilted outer surface, more specifically a tilted planar outer surface), which has a progressively decreasing projecting amount, which is measured in the radial direction and progressively decreases from the one end side to the other end side of the second rotatable shaft portion 61 in the direction of the rotational axis of the second rotatable shaft portion 61. A step 92, which is engageable with the engaging portion 87 of the output gear 6, is formed in a lower end surface of the resilient projection 91 shown in FIG. 12. Here, it should be noted that the tilted planar outer surface of the resilient projection 91 may be changed to a tilted curved outer surface or any other type of tilted outer surface.

As discussed above, the drive force transmission apparatus of the present embodiment can provide advantages, which are similar to those of the first embodiment and the second embodiment.

Now, modifications of the above embodiments will be described.

In the above embodiments, the drive force transmission apparatus of the present disclosure is applied to the coupling unit, which transmits the rotational drive force of the motor M to the valve shaft 4 of the tumble valve 3. Alternatively, the drive force transmission apparatus of the present disclosure may be applied to a drive force transmission apparatus, which transmits the rotational drive force of the motor M to a shaft of a valve (a driven subject), which opens and closes a flow passage.

Furthermore, the valve, which is the valve element of the intake air control valve (e.g., the tumble control valve or the intake air throttle valve), or the valve, which is the valve element of the exhaust gas control valve (e.g., the EGR control valve or the exhaust gas throttle valve), is not limited to be one of the multiple valves, which are connected one after another by, for example, the shaft. That is, the valve, which is the valve element of the intake air control valve (e.g., the tumble control valve or the intake air throttle valve), or the valve, which is the valve element of the exhaust gas control valve (e.g., the EGR control valve or the exhaust gas throttle valve), may be a single valve as long as the valve is placed in the flow passage communicated with the cylinder of the internal combustion engine.

Furthermore, the valve (the driven subject), which opens and closes the flow passage, may be a rotary valve, a butterfly valve, a shutter valve, or a ball valve.

In the above embodiments, the drive force transmission apparatus of the present disclosure is applied to the coupling unit, which is installed to the electric actuator that rotates the valve shaft 4 of the tumble control valve used in the intake system of the internal combustion engine. Alternatively, the drive force transmission apparatus of the present disclosure may be applied to a coupling unit (drive force transmission apparatus) installed in an electric actuator that rotates a shaft of a swirl control valve used in the intake system of the internal combustion engine.

Here, the tumble control valve includes the valve and the shaft. In the tumble control valve, the valve generates the biased linear intake air flow (biased flow), which is biased to the one side in a direction of the height (i.e., a top-to-bottom direction in the case where the sliding direction of the piston is defined as the top-to-bottom direction) of the intake port of the internal combustion engine, so that the intake air circulating flow (a vortex flow, a tumble flow) is generated in the combustion chamber around the axis perpendicular to the axis of the cylinder in the engine. The shaft of the tumble control valve supports the valve of the tumble control valve.

Furthermore, the swirl control valve includes the valve and the shaft. In the swirl control valve, the valve generates a biased linear intake air flow (biased flow), which is biased to the one side in a direction of the height (i.e., a top-to-bottom direction in the case where the sliding direction of the piston is defined as the top-to-bottom direction) of the intake port of the internal combustion engine, so that the intake air circulating flow (a vortex flow, a swirl flow) is generated in the combustion chamber around the axis of the cylinder in the engine. The shaft of the swirl control valve supports the valve of the swirl control valve.

In the above embodiments, the drive force transmission apparatus of the present disclosure is applied to the coupling unit installed in the electric actuator that rotates the valve shaft 4 of the tumble control valve used in the intake system of the internal combustion engine. Alternatively, the drive force transmission apparatus of the present disclosure may be applied to a coupling unit (a drive force transmission apparatus), which is installed to an electric actuator that rotates a shaft of a variable intake air control valve used in a variable intake system, which improves an engine output torque by changing a flow passage length from a valve hole to an intake port of each cylinder of the internal combustion engine or a flow passage cross sectional area according to an operational state of the internal combustion engine to use an intake air pressure pulsation effect and an inertia charging effect that take place in the intake passage of the internal combustion engine.

Furthermore, the drive force transmission apparatus of the present disclosure may be applied to a coupling unit (a drive force transmission apparatus) installed in an electric actuator that rotates a shaft of an intake air flow quantity control valve used in an electronic throttle (intake system), which adjusts the flow quantity of the intake air supplied to a combustion chamber of the internal combustion engine.

Furthermore, the shaft, which serves as the driven subject, may be a shaft of a valve of an intake air control valve, such as an intake air pressure control valve, a flow passage change valve, or an intake air throttle valve.

Furthermore, the shaft, which serves as the driven subject, may be a shaft of a valve of an exhaust gas control valve, such as a wastegate valve, a scroll change valve, an exhaust gas flow quantity control valve, an exhaust gas pressure control valve, a flow passage change valve, or an exhaust gas throttle valve.

The shaft, which serves as the driven subject, may be a shaft of a rotatable body (a rotator), such as a compressor, a blower, a pump, a cam, a rotor, or a vehicle wheel besides the shaft of the valve discussed above. Furthermore, in place of the shaft, which serves as the driven subject, a shaft or a rod of a linearly movable body, such as a piston or a valve, may be used.

Furthermore, the shape (e.g., the semispherical form or the tapered form) of the resilient projection 91 is not limited to any particular one and can be any suitable one as long as the generated stress, which is generated at the time of resilient deformation of the resilient projection 91 during the assembly, is within the elastic region.

Furthermore, the recessed groove 81 of the through-hole 55 may be a recessed groove, which is spirally wound. Furthermore, a plurality of recessed grooves may be formed in the through-hole 55 such that the recessed grooves are arranged one after another in a circumferential direction of the through-hole 55. Furthermore, the recessed groove may be eliminated from the through-hole 55, if desired.

Furthermore, in the above embodiments, the projecting shaft portion 57 is formed integrally with the first rotatable shaft portion 54 on the other end side of the first rotatable shaft portion 54 in the output gear 6. Alternatively, the projecting shaft portion 57 may be formed as a part of the first rotatable shaft portion 54. Further alternatively, the projecting shaft portion 57 may be eliminated from the output gear 6, if desired. In such a case, the entire projection, which projects from the first opposing portion 51 of the output gear 6 toward the other end side, serves as the first rotatable shaft portion 54.

Additional advantages and modifications will readily occur to those skilled in the art. The present disclosure in its broader terms is therefore not limited to the specific details, representative apparatus, and illustrative examples shown and described.

What is claimed is:

1. A drive force transmission apparatus that transmits a drive force of an electric motor to a shaft of a driven subject, the drive force transmission apparatus comprising:
    a first rotatable member that includes a gear tooth forming portion, which is configured into a tubular form and is engageable with a motor-side gear that is rotated upon receiving the drive force of the electric motor;
    a second rotatable member that couples between the shaft and the first rotatable member to enable integral rotation of the shaft and the first rotatable member; and
    a shock absorbing member that is made of a rubbery elastic material, wherein the shock absorbing member is placed between the first rotatable member and the second rotatable member and is elastically deformable in a twisting direction about a rotational axis of the first rotatable member and the second rotatable member, wherein:
    the first rotatable member includes:
        a first shaft portion, which is configured into a tubular form and extends in a direction parallel to the rotational axis, wherein the first shaft portion is located on a radially inner side of the gear tooth forming portion; and
        a through-hole that extends through the first shaft portion to communicate between one end surface and another end surface of the first shaft portion in the direction parallel to the rotational axis;
    the second rotatable member includes a second shaft portion that is fitted into the through-hole from one end side to another end side of the through-hole in the direction parallel to the rotational axis;
    the second shaft portion includes a resilient projection that projects outwardly in a radial direction, which is perpendicular to the direction parallel to the rotational axis, from an outer peripheral surface of a peripheral wall part of the second shaft portion, which extends continuously all around the rotational axis and is located at another end side of the second shaft portion that is opposite from one end side of the second shaft portion where the one end side of the through-hole is placed;
    the resilient projection is axially spaced from a distal end of the second shaft portion toward the one end side of the through-hole;
    the resilient projection is resiliently inwardly deformed in the radial direction at least during movement of the resilient projection along the another end side of the through-hole at a time of fitting the second shaft portion into the through-hole;
    the resilient projection is entirely located on a radially outer side of the outer peripheral surface of the second shaft portion when the resilient projection is resiliently inwardly deformed in the radial direction; and
    the resilient projection is resiliently outwardly restored and is engaged to an opening end surface of the through-hole, which is formed at the another end side of the through-hole in the first shaft portion, immediately after passing through the through-hole at the time of fitting the second shaft portion into the through-hole.

2. The drive force transmission apparatus according to claim 1, wherein the resilient projection is configured into one of a partially spherical form and a tapered form, each of which has a progressively decreasing projecting amount, which is measured in the radial direction and progressively decreases from the one end side to the another end side of the second shaft portion the direction parallel to the rotational axis.

3. The drive force transmission apparatus according to claim 1, wherein the resilient projection includes a step that interferes with the opening end surface of the through-hole in the direction parallel to the rotational axis.

4. The drive force transmission apparatus according to claim 1, wherein the through-hole includes a recessed groove, and the resilient projection displaceably contacts the recessed groove at the time of fitting the second shaft portion into the through-hole.

5. The drive force transmission apparatus according to claim 4, wherein the recessed groove extends in a direction that is tilted relative to the direction parallel to the rotational axis.

6. The drive force transmission apparatus according to claim 4, wherein the recessed groove extends in the direction of the direction parallel to the rotational axis.

7. The drive force transmission apparatus according claim 4, wherein the recessed groove extends from an opening of the through-hole at the one end side of the through-hole or a location adjacent to the opening of the through-hole at the one end side of the through-hole to an opening of the through-hole at the another end side of the through-hole or a location adjacent to the opening of the through-hole at the another end side of the through-hole or a location immediately before the opening of the through-hole at the another end side of the through-hole.

8. The drive force transmission apparatus according claim 1, wherein:
    the resilient projection is rotatable together with the rest of the second rotatable member relative to the first rotatable member;
    the opening end surface of the through-hole is an engaging portion, to which the resilient projection is engaged; and the engaging portion has an arcuate inner peripheral edge that has no radial recess along an entire rotatable range of the resilient projection relative to the first rotatable member.

9. The drive force transmission apparatus according claim 1, wherein the resilient projection has a planar surface, which is parallel to the opening end surface of the through-hole and is engaged to the opening end surface of the through-hole in the direction parallel to the rotational axis.

10. The drive force transmission apparatus according claim 1, wherein the first rotatable member includes two limiting walls that are opposed to each other in a circumferential direction while an arcuate gap is interposed between the two limiting walls, and the resilient projection is placed in the arcuate gap and is abuttable against one of the two limiting walls when relative rotation is generated between the first rotatable member and the second rotatable member.

11. The drive force transmission apparatus according claim 1, wherein the resilient projection is a single resilient projection formed at the second shaft portion.

12. The drive force transmission apparatus according claim 1, wherein the resilient projection is resin molded integrally with a rest of the second rotatable member.

* * * * *